Oct. 26, 1948.                    F. J. SCHUTT                    2,452,497
                CONTROL AND INDEXING MECHANISM FOR DOCUMENT
Filed March 30, 1944              PHOTOGRAPHING MACHINES
                                                    10 Sheets-Sheet 6

INVENTOR
FRIEDRICH J. SCHUTT
BY
ATTORNEY

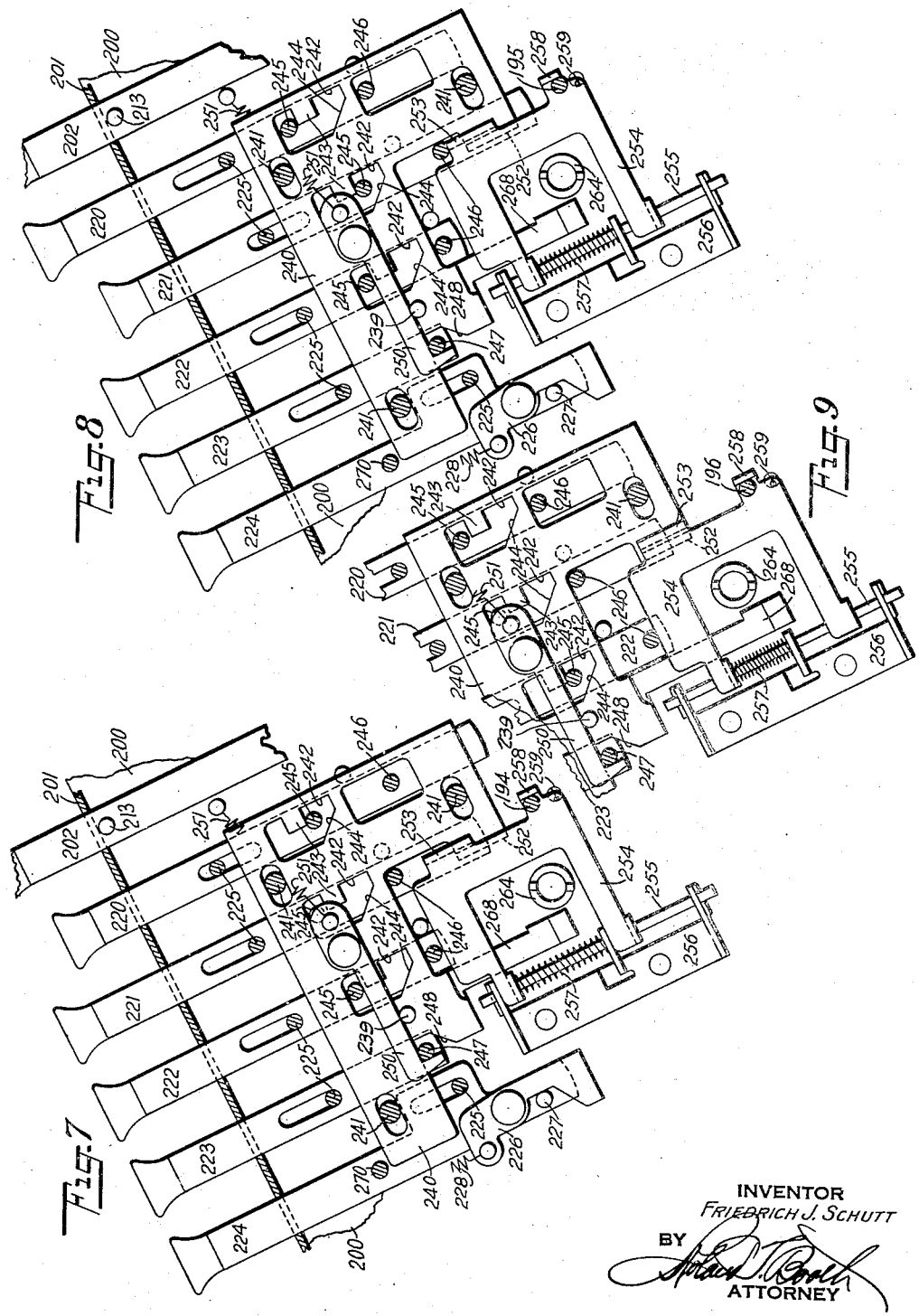

Oct. 26, 1948.  F. J. SCHUTT  2,452,497
CONTROL AND INDEXING MECHANISM FOR DOCUMENT
PHOTOGRAPHING MACHINES
Filed March 30, 1944  10 Sheets-Sheet 8

INVENTOR
FRIEDRICH J. SCHUTT
BY
ATTORNEY

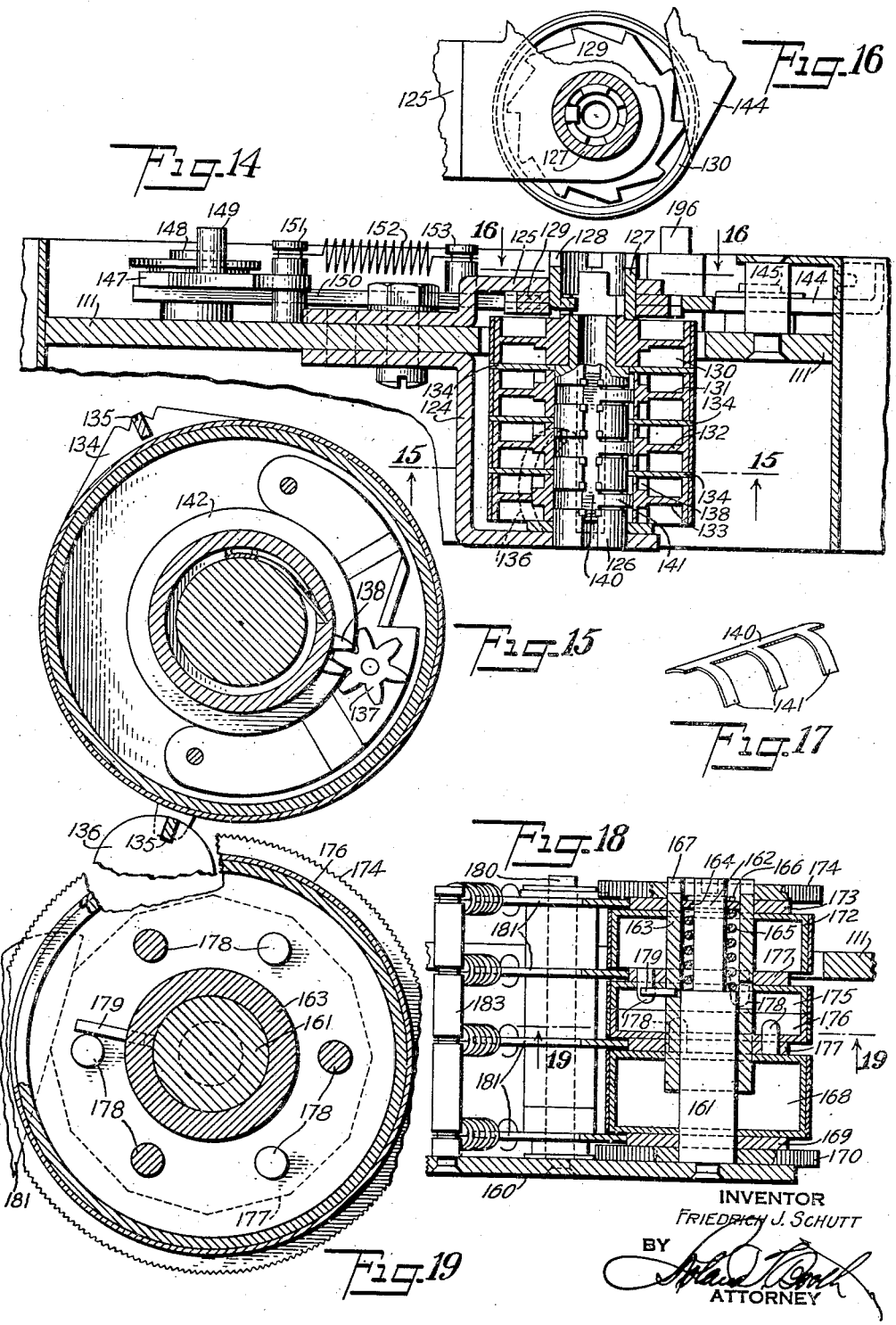

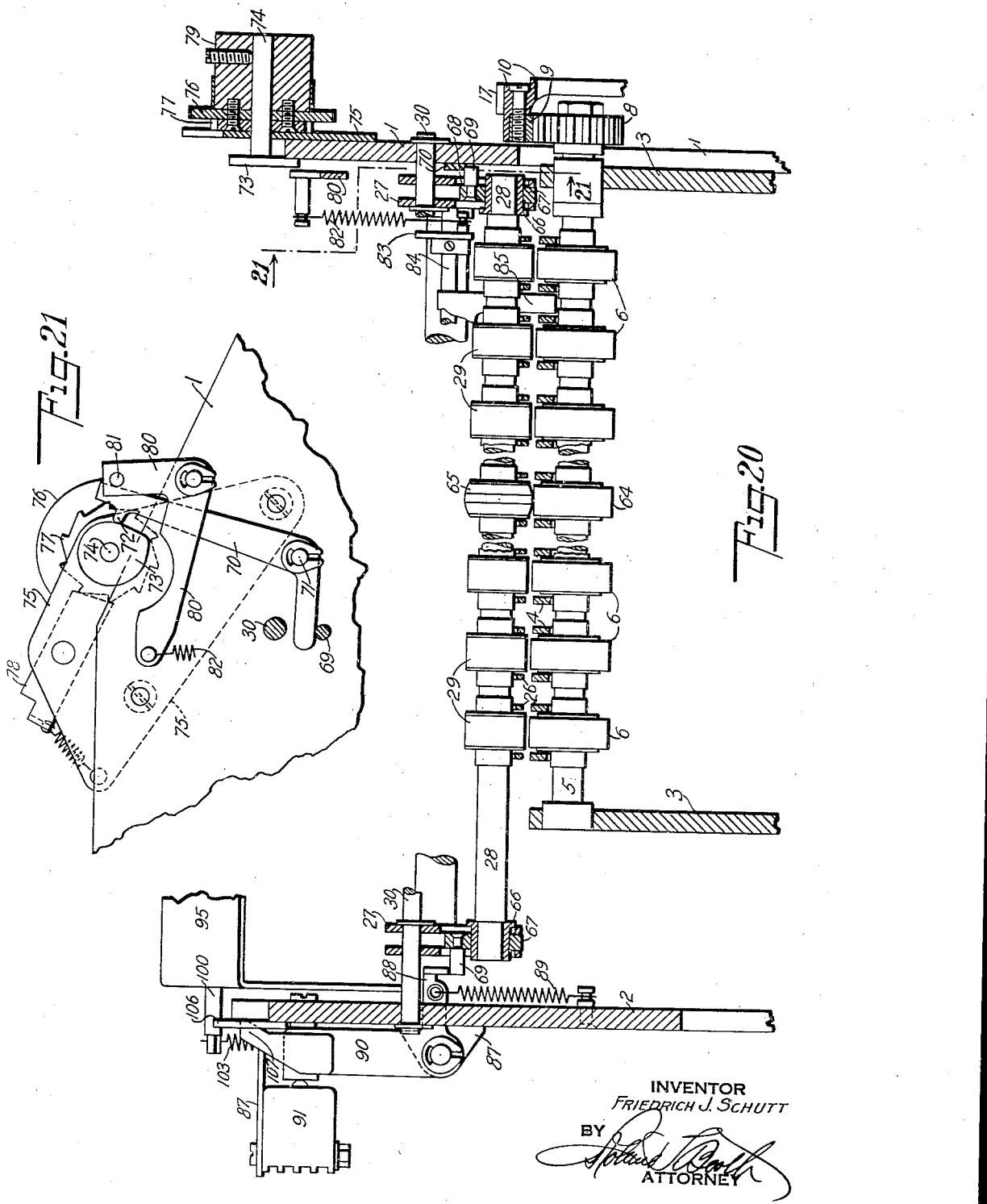

Patented Oct. 26, 1948

2,452,497

UNITED STATES PATENT OFFICE 2,452,497

CONTROL AND INDEXING MECHANISM FOR DOCUMENT PHOTOGRAPHING MACHINES

Friedrich J. Schutt, Brooklyn, N. Y., assignor to Remington Rand Inc., Buffalo, N. Y., a corporation of Delaware Application March 30, 1944, Serial No. 528,682

7 Claims. (Cl. 235—91)

The present invention relates to improvements in document photographing machines and particularly to mechanism for controlling the operation thereof and indexing mechanism therefor.

The invention comprehends improvements in control mechanism for document photographing machines to provide for the control of the lights and film feed thru the provision of a single control lever operable by a plurality of actuating means engageable therewith at different positions and arranged in relation to the document feed mechanism so that the actuating members for the lever can be moved into disengaged inoperative position or removed from the machine without interfering with the mounting and assembly of the lever in the machine.

The invention provides suitable control means operable to render the document feed mechanism inoperative whenever more than one document is fed at one time and means for varying the operation of the control means according to varying thicknesses of documents. A control of the document feed is provided for stopping the feed of documents whenever the light support is not in operative position.

The invention provides a control to stop the feeding of documents whenever more than one thickness of documents or sheet material is fed at the same time having an arrangement for varying the control by document thickness thru manual operation of suitable setting means adapted to set the control for passing documents of different thickness for each setting.

The invention further comprehends the provision of an indexing mechanism for document photographing machines arranged to display desired indexing material for photographing simultaneously with documents arranged so that a photographic record of the index for the document is made upon the film with the pictures of the document. The indexing mechanism provides for a plurality of different and independent indexes so that an indexing number; district number or zone number; date; information regarding location, such as city, town and the like; and information regarding governmental and company names; branches and divisions may all be photographed with the document in successive order on the film. Control mechanism is provided for setting the various indicia displaying mechanism in a convenient manner so that the operator of a document photographing machine may change the setting of any indicia by the operation of suitable control and setting mechanism.

In the drawings:

Figs. 7, 8 and 9 are fragmentary views of the push button control mechanism similar to Fig. 6 showing different positions of the parts obtained by operation of each of the several push button control slides.

Fig. 14 is an enlarged detailed cross-section taken on line 14—14 of Fig. 4.

Fig. 15 is a detailed cross-section taken on line 15—15 of Fig. 14.

Fig. 16 is a cross-section taken on line 16—16 of Fig. 14.

Fig. 17 shows the numeral drum setting member for setting the numeral drum to zero position, in perspective.

Fig. 18 is an enlarged cross-section taken on line 18—18 of Fig. 4.

Fig. 19 is an enlarged cross-section taken on line 19—19 of Fig. 18.

Fig. 20 is an enlarged detailed cross-section taken on line 20—20 of Fig. 1 showing the double document control mechanism.

Fig. 21 is a vertical cross-section taken on line 21—21 of Fig. 20.

Figure 1:
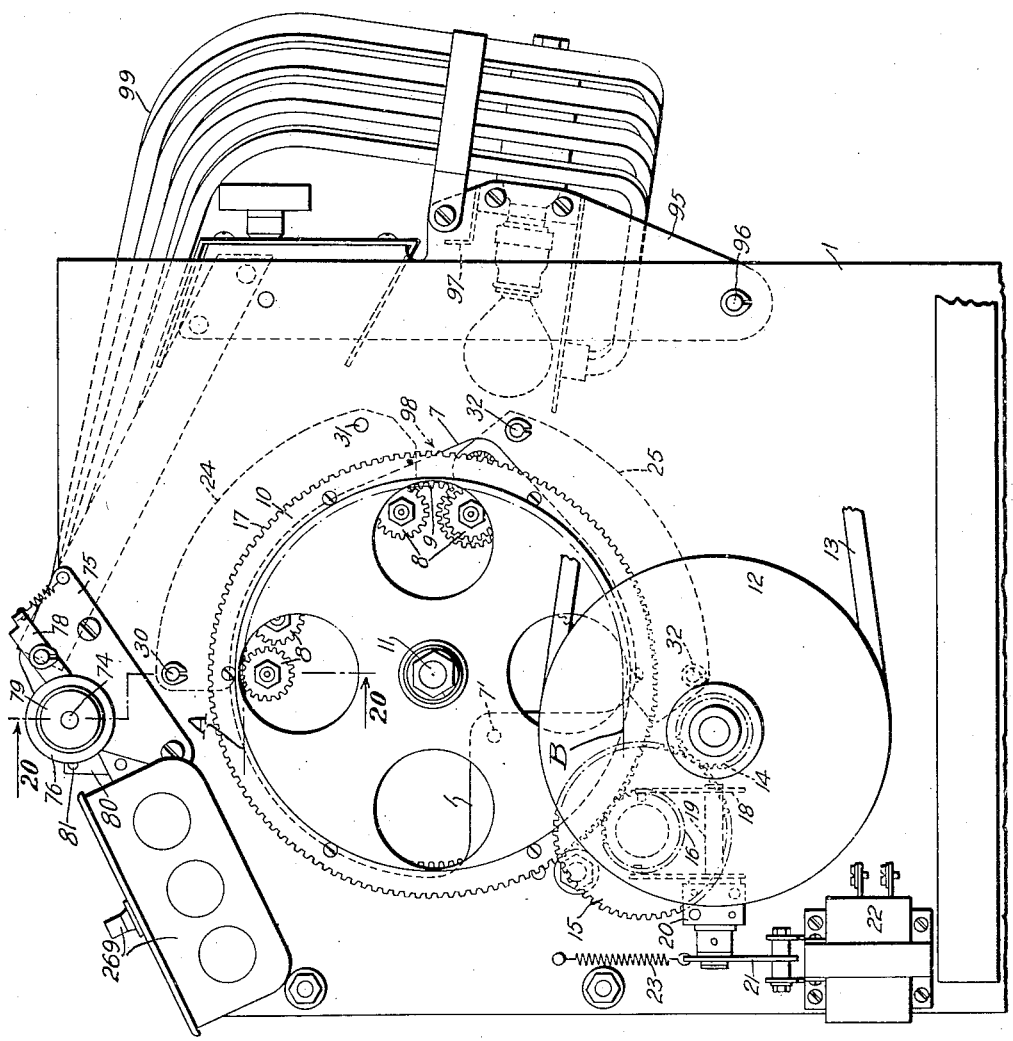
Fig. 1 shows the document feed mechanism for a document photographing machine in side elevation looking from the right-hand side of the machine, the casing of the machine being omitted for convenience in illustrating the main drive mechanism for the document feed and the frame for mounting the illuminating means.

This invention provides improvements over the document feeding, control and indicia displaying mechanisms disclosed in co-pending application Serial No. 472,359, filed January 14, 1943. The general construction of the document photographing machine employing the present invention is disclosed in this co-pending application and the structure shown herein may be substituted for the corresponding structure shown in said application. The document feed rolls and supporting structure therefor, corresponds to that shown in a co-pending application on document feed construction filed simultaneously herewith, Serial No. 528,681, Patent No. 2,377,525. Other features of the device are claimed in divisional application No. 895, filed on January 7, 1948. The document photographing machine disclosed in both of the co-pending applications discloses a frame structure for supporting the various mechanisms of the machine having side walls at the front ends of the base portion for supporting the document feed, the illuminating means and the control mechanism for the machine.

Right and left-hand side walls 1 and 2 correspond to the side walls shown in the aforementioned applications. The document feed mechanism has end plate 3 mounted in spaced parallel relation for supporting a plurality of spaced parallel arcuate guide bars 4, Fig. 20, to provide a curved path for guiding documents thereover from the top to the bottom portions thereof in a manner disclosed in the co-pending application Serial No. 528,681, filed simultaneously herewith. End plates 3 mount a plurality of feed shafts 5 carrying document feed rolls 6 rigidly mounted thereon in spaced relation and having the peripheries extending between arcuate guide bars 4 with a portion of the periphery of each feed roll extending beyond the outer periphery of arcuate guide bars 4 for engaging and feeding documents over the outer edges of said guide bars. Feed shafts 5 are journalled in end plates 3 and at the right-hand ends, as shown in Fig. 3, the shafts project thru an opening in end plate 1 indicated at 7 in Fig. 1 where each shaft carries a small gear 8 inter-meshing with internal gear 9 of main drive gear 10.

Figure 3:
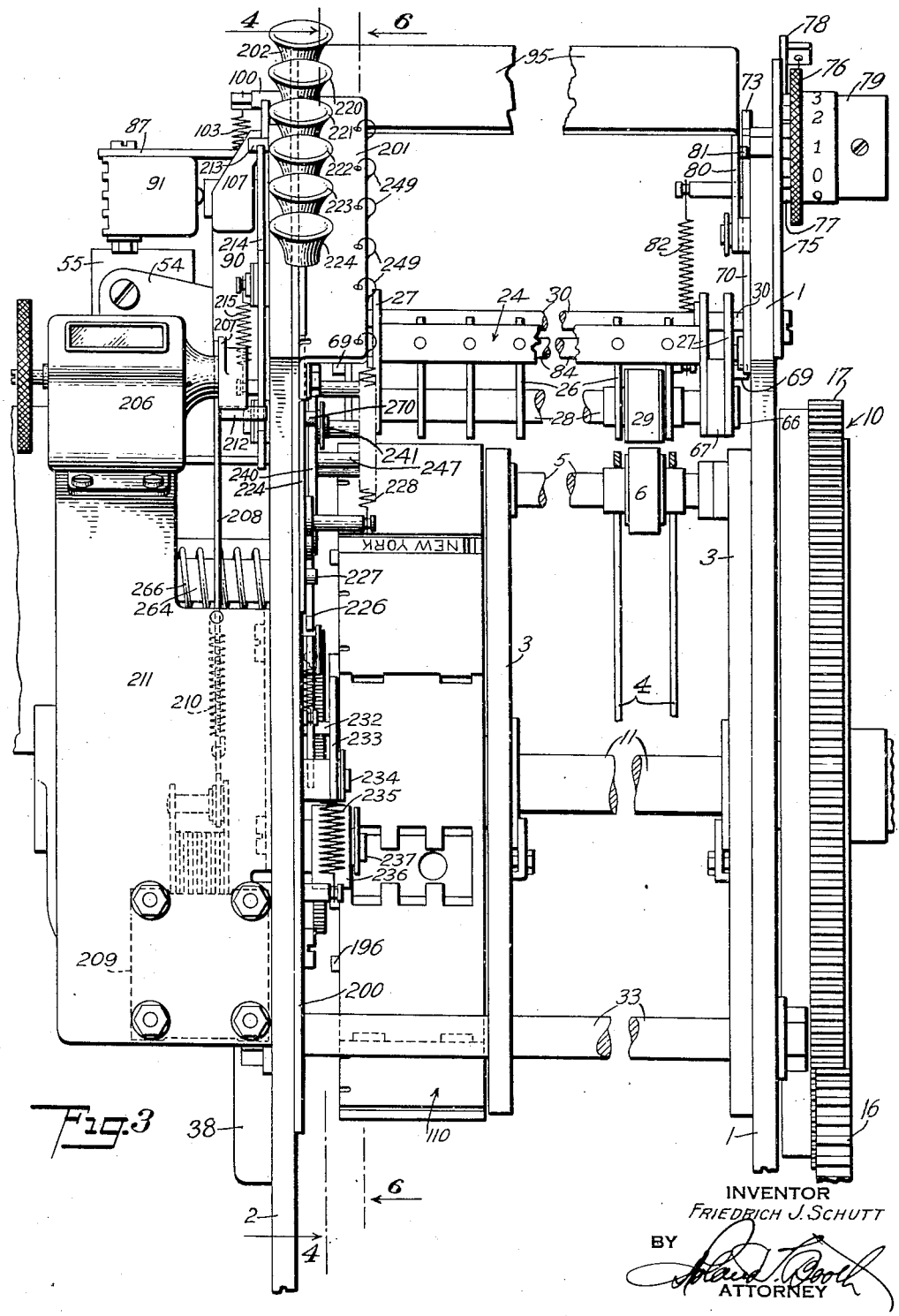
Fig. 3 is an enlarged fragmentary front elevation with the central portion of the document feed mechanism omitted, the casing omitted for illustrating the portions of the main drive mechanism mounted in the side walls at the front of the machine with the document feed control mechanism and indexing mechanism illustrated in front elevation.
Figure 5:
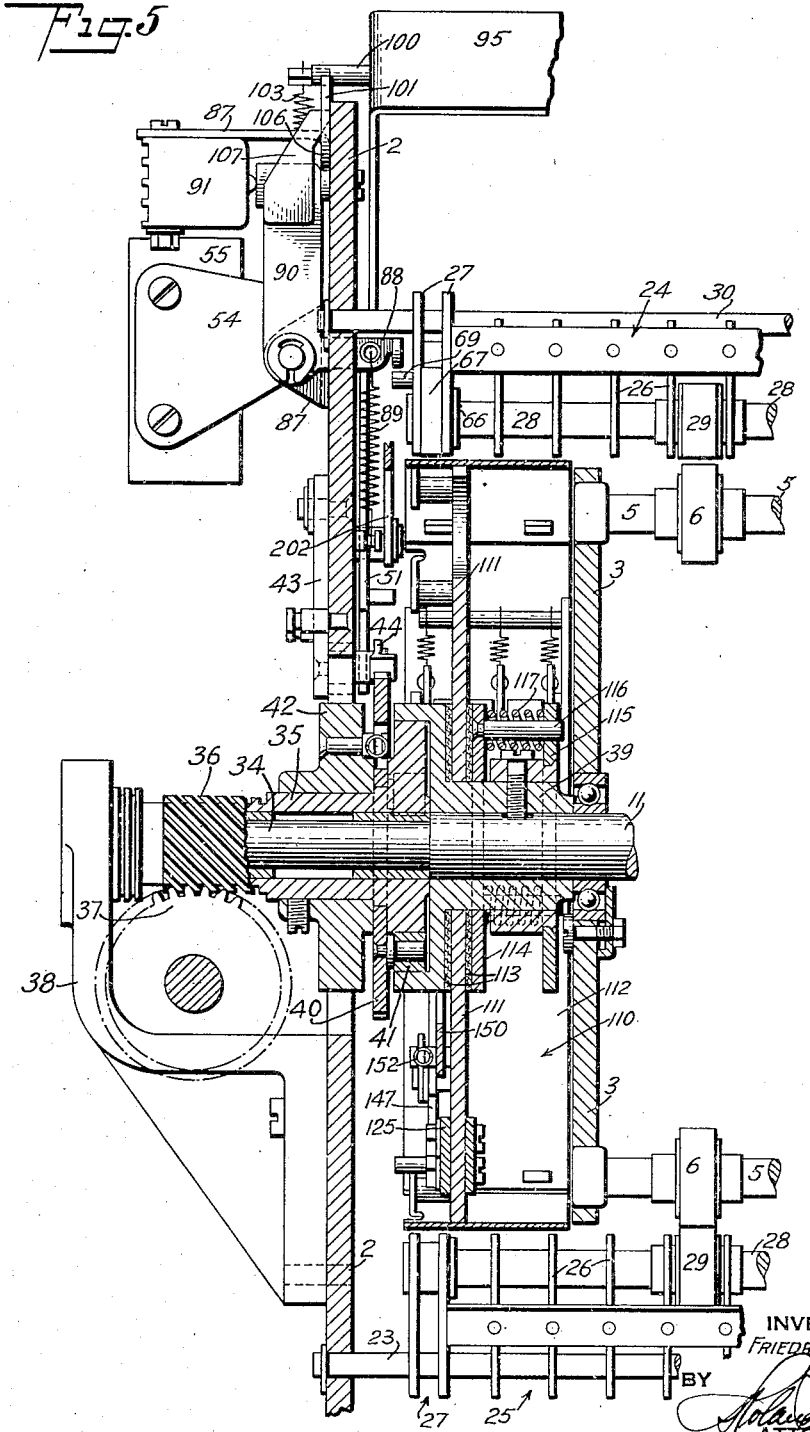
Fig. 5 is a vertical transverse section thru the left-hand side of the machine taken on line 5—5 of Fig. 4 particularly designed to illustrate the indexing drum and control mechanism in cross section together with the clutch construction for normally rotating the drum and operating the film feed drive.

Main drive gear 10 is rigidly mounted on main drive shaft 11 extending transversely across the front of the machine between side walls 1 and 2 and beyond the outer side thereof, as shown in Figs. 1, 3 and 5. A main drive pulley 12 is driven by an electric motor, not shown, thru belt 13. Pulley 12 is mounted on a stub-shaft carried by side wall 1 and carries a pinion 14 inter-meshing with gear 15 mounted on another stub-shaft carried by side wall 1 and having clutch controlled driving connection with gear 16 inter-meshing with the external gear teeth 17 on main drive gear 10.

The clutch control for the driving connection between gears 15 and 16 has a pair of clutch collar operating arms 18 carried by rod 19 rotatably mounted in bearing bracket 20 secured to the outer side of side wall 1. A lever 21 is mounted on the end of rod 19 at the opposite side of the bearing from clutch collar operating arm 18, as shown in Fig. 1, and has the free end thereof connected with the armature of solenoid 22. The clutch is disengaged when the solenoid is energized. When solenoid 22 is not energized a coil spring 23 having opposite ends secured to lever 21 and side wall 1 respectively, as shown in Fig. 1, operates lever 21 to rotate rod 19 and maintain the clutch in engaged relation for driving main drive gear 10 in the rotation of main drive pulley 12 by the motor.

Upper and lower document guide units are shown in dotted lines in Fig. 1 at 24 and 25 respectively, and have fragmentary portions also shown in Figs. 3, 4, 5 and 20. These upper and lower guide members have a plurality of arcuate guide bars 26 mounted in spaced parallel relation between and supported by end members 27. Upper and lower guide members 24 and 25 carry a plurality of feed shafts 28 each mounting a plurality of document feed rolls 29 arranged to have the peripheries thereof extend between guide bars 26 and engage the peripheries of feed rolls 6. Feed rolls 6 and 29 are arranged in pairs for peripheral engagement to engage opposite sides of documents fed into the machine and move them between guide bars 4 and 26 from the top front portion of the machine through a photographing position for photographing the documents and feeding them outwardly from the machine at the bottom portion of the guide bars, in a manner disclosed in both of the aforementioned co-pending applications.

A supporting rod 30 extends through the upper front corners of upper guide member 24 and has the free ends detachably engaged in openings in side walls 1 and 2 for pivotally supporting upper guide member 24 in transversely extending relation between side walls 1 and 2. A suitable latch member having latch rods 31 secures the lower rear end of upper guide member 24 in operative position, as shown in Fig. 1. A pair of supporting rods 32 engaged in transversely extending relation through end members 27 of the lower guide member 25 removably mounts the lower guide member in operative position between side walls 1 and 2. The feed rolls and feed roll shafts of upper and lower guide units 24 and 25 are mounted for radial sliding movement and are resiliently projected to maintain the peripheries of feed rolls 29 in feeding engagement with the peripheries of feed rolls 6 on feed shafts 5 of the main feed unit. End plates 3 have projecting portions mounted on supporting rod 33 secured at opposite ends in side walls 1 and 2. The right-hand end plate 3 has an aperture in the central portion for engagement over a supporting stud carried by a portion of side wall 1 projecting toward main drive shaft 11 as indicated in Fig. 1 at 7'. This provides for detachable mounting of the main document feed unit between side walls 1 and 2. The path for feeding documents is arranged in concentric relation to main drive shaft 11 having roller bearing mountings in end plates 3. Documents enter the feed unit at the top as indicated at A, Fig. 1, and after passing through a semi-circular path past the photographing position are discharged at the bottom of the unit at B.

Figure 4:
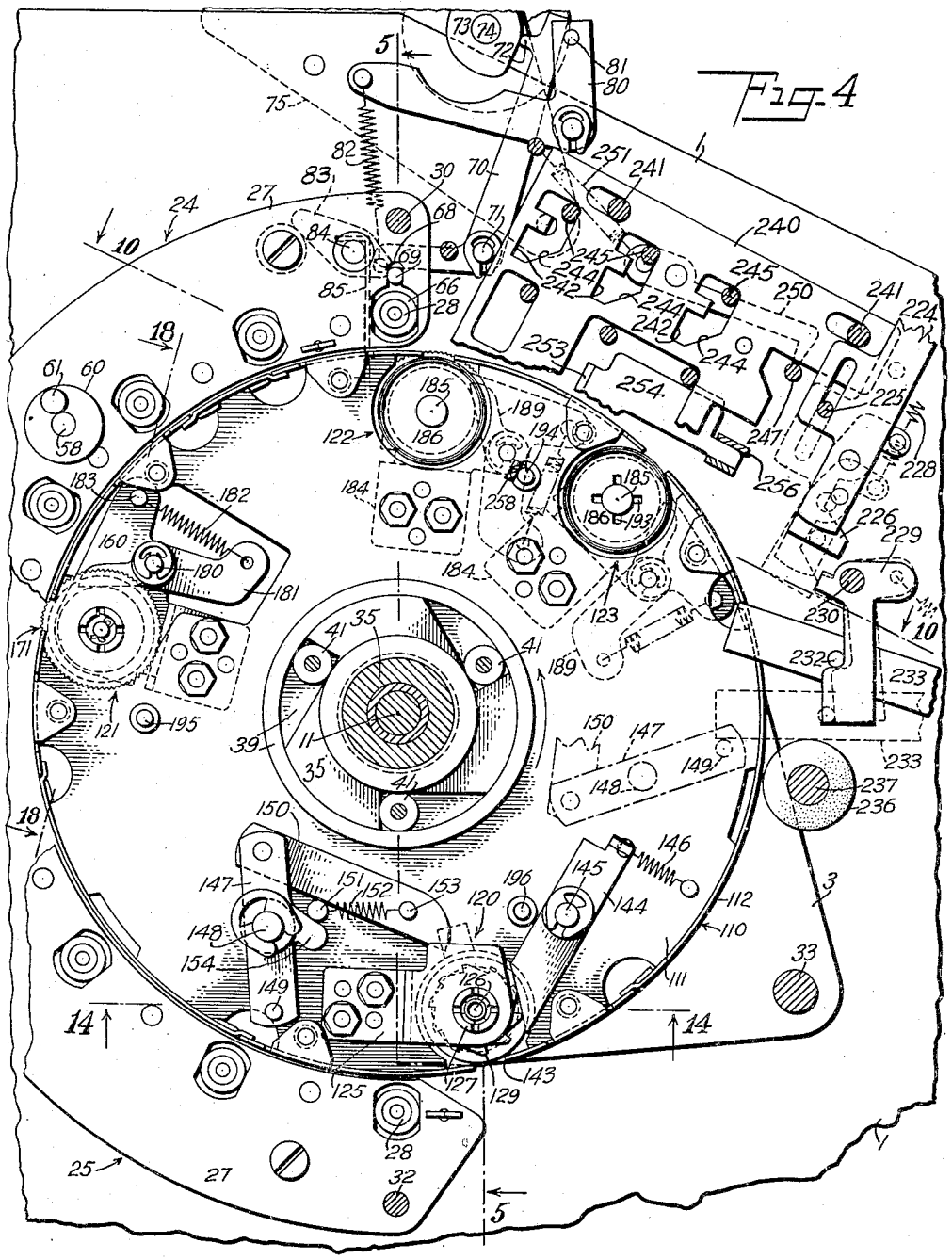
Fig. 4 is a vertical longitudinal cross section taken substantially on line 4—4 of Fig. 3 showing the indexing drum in end elevation looking from the left-hand side of the machine with portions of the push button control slides omitted for convenience in illustration.

The left-hand end of main drive shaft 11 extends beyond left-hand side plate 3 as shown in Fig. 5 thru an opening in side wall 2. The left-hand end of shaft 11 has a reduced end 34 rotatably mounting clutch member 35 thereon having a worm gear 36 formed on the outer end intermeshing with worm gear 37 carried by drive shaft for the film drive mechanism. The outer end of clutch member 35 has a rotatable thrust bearing mounting in bearing bracket 38 mounted on the outer face of side wall 2. A clutch member 39 has an annular flange for receiving the periphery of the clutch disc portion of clutch member 35 and a hub portion secured to main drive shaft 11 between left-hand end plate 3 and side wall 2, as shown in Fig. 5. A clutch control ring 40 having a toothed outer periphery is rotatably mounted on rotatable clutch member 35 adjacent the clutch disc portion thereof and carries clutching rollers 41, as shown in Figs. 4 and 5. A clutch ring retaining disc 42 is mounted on the hub portion of rotatable clutch member 35 against rotation relative thereto and normally retains clutch control ring 40 in position for securing operation of clutching rollers 41. Resilient means connected between clutch ring retaining disc 42 and clutch ring 40 normally tends to rotate clutch ring 40 for engaging the rollers between clutch member 35 and the flange on clutch member 39 in clutching engagement for driving worm gear 36 from main drive shaft 11.

Figure 2:
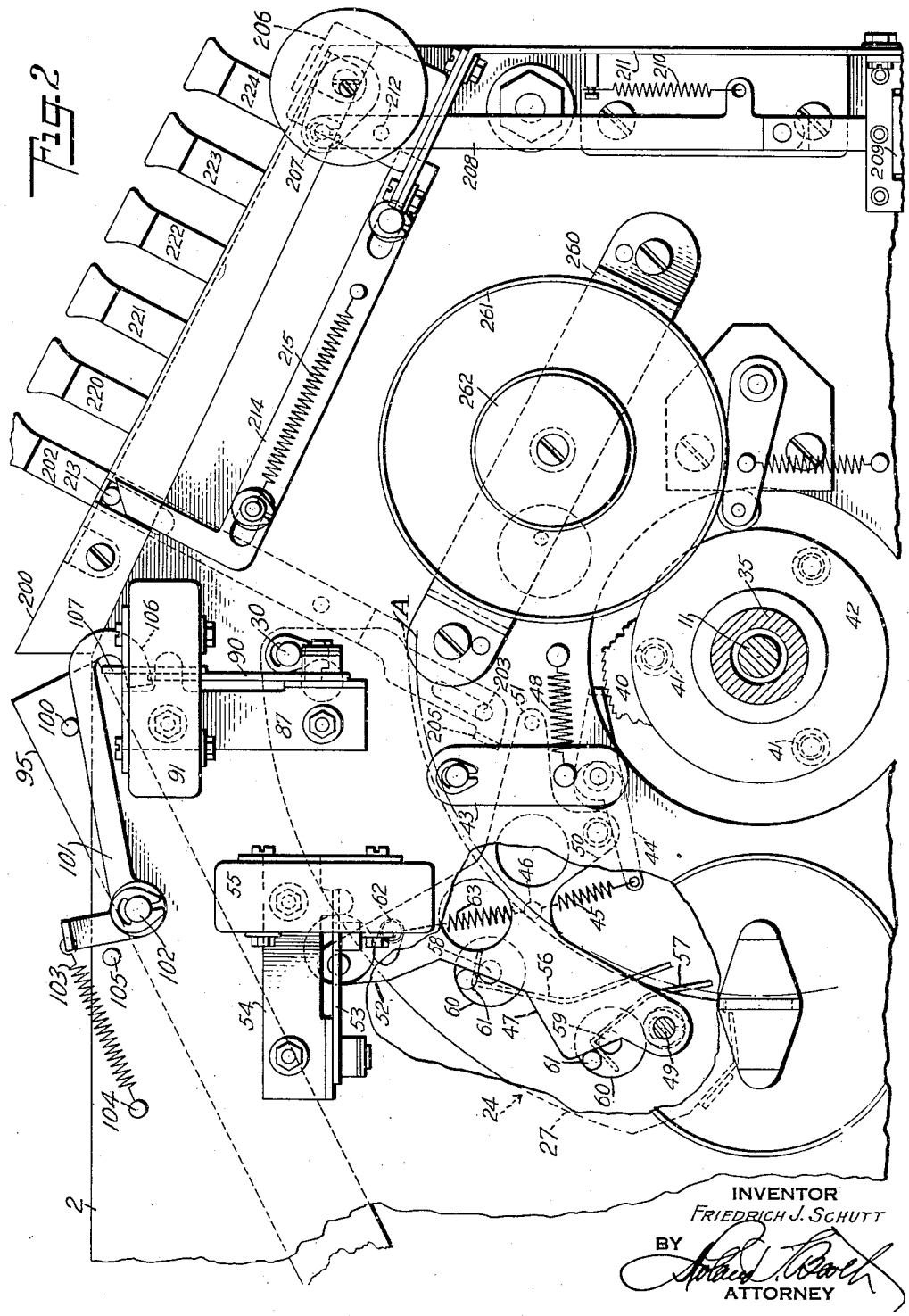
Fig. 2 is an enlarged fragmentary side elevation of the upper front portion of the document feed mechanism of the machine looking from the left-hand side of the machine, the outer casing for the machine being omitted.

A link 43 has its upper end pivoted to side wall 2 as shown in Fig. 2, and at the lower end mounts a laterally extending stud pivotally mounting the central portion of pawl 44 having one end formed to engage the teeth on clutch control ring 40 and the opposite end connected by tension spring 45 to a pin 46 on control lever 47. The stud carried by the lower end of link 43 extends thru an aperture in side wall 2 in order that the link positioned on the outside of side wall 2 can mount pawl 44 at the inside of side wall 2 with the free end formed to engage the ratchet teeth on clutch control ring 40 to retain clutch rollers 41 in disengaged relation between clutch members 35 and 39. A coil spring 48 has one end secured to the lower end portion of link 43 and the other end anchored to a pin carried by side wall 2 forwardly of link 43 in order that the link will be resiliently moved so that the stud carrying pawl 44 will be engaged with side wall 2 at the front edge of the opening thru which the stud extends.

Control lever 47 is of irregular shape, has one end pivotally mounted on stud 49 on the inner side of side wall 2 and a clutch operating arm 50 provided with a stud for engaging the left-hand end of pawl 44, as shown in Fig. 2. Clutch operating arm 50 is positioned to have the stud thereon disengage pawl 44 from clutch control ring 40 when lever 47 is moved in a clockwise direction, as shown in Fig. 2. Lever 47 has an arm 51 for manual operation in controlling the machine in a manner that will be hereinafter described. An upwardly extending arm 52 on control lever 47 has a laterally extending pin thereon for engaging and operating the inclined end of a bell crank lever 53 pivoted on bracket 54 mounted on side wall 2. A micro-switch 55 is mounted on bracket 54 at the opposite end from bell crank 53 and is adapted to be operated by bell crank 53 in the operation of control lever 47 so that whenever control lever 47 is moved in a clockwise direction, as shown in Fig. 2, bell crank 53 will operate micro-switch 55 to close the circuit controlling the lights for illuminating the documents being fed through the photographic position by the document feed mechanism.

Documents being fed between feed rolls 6 and 29 in the semi-circular path hereinbefore mentioned engage and operate primary and secondary control fingers 56 and 57, as shown in Fig. 2, mounted on control shafts 58 and 59 respectively, rotatably mounted in end members 27 of upper guide unit 24. The left-hand ends of each of the control shafts 58 and 59 mount annular discs 60 each having an eccentric pin 61 mounted thereon extending toward the inside of side wall 2 and engaging against the edge portion of control lever 47 at two different places, as shown in Fig. 2. When fed documents engage and operate primary and secondary control fingers 56 and 57 respectively, they are moved in a clockwise direction as shown in Fig. 2, rotating discs 60 and moving pins 61 to engage and rotate control lever 47 in a clockwise direction for operating micro-switch 55 into circuit closing position and disengaging pawl 44 from clutch control ring 40. This closes the light circuit for illuminating documents passing through the photographing position and engages the clutch for feeding film so that pictures of the documents are taken as they pass through the photographing position. A stud 62 mounted on the inner face of side wall 2 extends inwardly through a slot in the upwardly extending arm 52 of control lever 47 and serves to limit its rotary motion on stud 49. A tensioned coil spring 63 has one end connected to stud 62 and the other end to pin 46 carried by control lever 47 for normally moving control lever 47 into an inoperative position so that pawl 44 is engaged with clutch control ring 40 and the pin on arm 52 allows bell crank 53 to be operated to open the circuit through micro-switch 55.

Thus, when either the primary or secondary fingers are operated by a document being fed through the machine between feed rolls 6 and 29 as above described, control lever 47 will be moved in a clockwise direction, as shown in Fig. 2, micro-switch 55 will be closed for lighting the lights and clutch ring 40 will be released to provide for engagement of the clutch members and the feeding of film by the operation of worm gear 37 by worm gear 36 carried on rotatable clutch member 35.

A controlling device is provided for stopping the feed of documents in the event more than one document is fed at a time, which may be set for operation to stop the machine whenever any document of greater than a limited thickness is fed into the machine.

This double document control mechanism has the uppermost feed shaft 5 of the main feed unit provided in the central portion of its length with a center metallic feed roll 64 as shown in Fig. 20. The upper feed shaft in the upper guide unit 24 arranged in paired relation with the upper feed shaft 5 has a centrally located metallic feed roll 65 thereon for peripheral engagement with feed roll 64 while the remaining feed rolls on this upper shaft do not have peripheral engagement with the corresponding feed rolls 6, as shown in Fig. 20. Opposite ends of the uppermost feed shaft 28 are mounted in bearing sleeves 66 carried by slidable blocks 67 engaged between the spaced plates of end members 27. Radially extending guide slots 68 in the plates of end members 27 slidably mount bearing sleeves 66 for radial movement and laterally extending pins 69 are slidably engaged in slots 68 in end members 27.

At the right side of the machine the free end of pin 69 engages one end of a bell crank lever 70 pivoted at 71 on a stud projecting inwardly from the inner face of side wall 1 while the upper end of bell crank 70 has a projection 72 engaging a thickness control cam 73. Thickness control cam 73 is mounted on the inner end of an adjusting shaft 74 having the central portion rotatably mounted in a bracket 75 secured to the outer face of side wall 1. The outer end of adjusting shaft 74 carries a knob 76 adapted for manual rotation to adjust the position of eccentric 73. A ratchet wheel 77 is mounted adjacent the inner end of knob 76 and has the free end of a spring actuated pawl 78 resiliently engaged therewith for normally holding adjusting shaft 74 against rotation. Pawl 78 is pivotally mounted on bracket 75, as shown in Fig. 21.

There are ten teeth on ratchet wheel 77 in order that pawl 78 will operate to normally hold the ratchet wheel against rotation by knob 76 in a predetermined position for each adjacent pair of teeth until the spring pressure of pawl 78 is manually overcome by positive manual rotation of knob 76. Knob 76 is in the form of an annular disc having a knurled periphery, as shown in Fig. 3, with a cylindrical portion adjacent the disc provided with indicia at 79 showing the position of thickness adjustment of knob 76. The numerals indicating the adjustment run from one to ten and represent thickness adjustments for sheets determining positions of adjustment where sheets of different thickness will be either fed through the machine or prevented from being fed by stopping the feed.

A bell crank lever 80, Fig. 4, is pivoted against the inner side of right-hand side wall 1 in front of the upwardly extending arm of bell crank lever 70, as shown in Fig. 4, on a stud projecting inwardly from side wall 1. One arm of bell crank 80 extends upwardly and has a pin 81 on the upper end extending laterally and engaging the forward edge of the upper upwardly extending arm of bell crank 70. The other arm of bell crank 80 extends rearwardly and has one end of a coil spring 82 connected to the end thereof. The opposite end of coil spring 82 is connected to one end of lever 83 extending radially from document straightening shaft 84 carrying document straightening fingers 85 for engaging the leading edge of a document immediately after it is fed into the feed mechanism between rolls 64 and 65. When any part of the leading edge of a document engages fingers 85, rolls 64 and 65 will continue to feed the document until the entire leading edge engages all of the fingers 85 when further feeding of the document will move fingers 85 and rock shaft 84 against the tension of spring 82 until the straightened document passes under the ends of the fingers. The straightened documents will then be guided through the feed mechanism with the leading edges in transversely extending relation. Coil spring 82 also operates simultaneously to maintain bell crank 80 with pin 81 in engagement with the upper end of bell crank 70 for maintaining projection 72 in constant engagement with the surface of eccentric 73. The lower end of bell crank 70 extends rearwardly and the rear free end thereof engages above laterally extending pin 69 at the right-hand side of the machine on slidable block 67 for holding the slidable block against upward movement.

It will be understood that the adjustment of knob 76 will vary the position of the end of bell crank 70 to hold pin 69 in a position moved inwardly to a greater extent than shown in Fig. 4, and may also be adjusted to provide for the movement outwardly beyond the position shown, according to the position of adjustment of the knob. This provides a fulcrum between the rearwardly extending arm of bell crank 70 and pin 69 at the right-hand side of the machine on which upper document feed and control shaft 28 carrying metallic feed roll 65 will be pivoted transversely in the machine as documents are fed between rolls 64 and 65. The left-hand end of upper feed and control shaft 28 with left-hand slide block 67 and pin 69 will be raised upwardly about the fulcrum on bell crank 70 to a small extent when a thin document passes between feed rolls 64 and 65 and to a greater extent when a thicker document passes therebetween. The movement of left-hand slide block 67 and pin 69 is greater than the thickness of the document because of the difference in leverage due to the distance between the fulcrum at the right-hand pin 69 on bell crank 70 and centrally located feed rolls 64 and 65.

The movement of left-hand slide block 67 and pin 69 is therefore greater than the document thickness engaged between rolls 64 and 65 and is utilized to operate switch control bell crank 86 pivotally mounted on bracket 87 on the outside face of left-hand side wall 2. A short substantially horizontally extending arm 88 on bell crank 86 extends inwardly through an opening in side wall 2 and is formed with a lateral extension to normally engage the top peripheral portion of the projection 69 on left-hand slide block 67, Fig. 20. A coil spring 89 secured at one end to short arm 88 of bell crank 86 and at the opposite end to a stud on the inner face of side wall 2 firmly maintains the end of arm 88 engaged with left-hand projection 69 to maintain feed and control roll 65 in resilient rolling contact with roll 64. The other arm 90 of bell crank 86 extends upwardly along the outside of left-hand side wall 2, as shown in Figs. 3 and 20, and has the free end provided with a lateral projection for engaging the operating pin of micro-switch 91 mounted on the upper portion of bracket 87, as shown in Figs. 2, 3 and 20.

In the counter-clockwise rotation of bell crank 86 through the raising of pin 69 by a document engaging between feed and control rolls 64 and 65, it will be seen that by controlling the position of the fulcrum for upper shaft 28 at the right-hand end, the amount of vertical movement at the left-hand end of the control shaft can be utilized to actuate micro-switch 91 to close the circuit thereto and actuate control means for stopping the feed of documents whenever the document thickness is greater than the amount for which the knob 76 is set. Micro-switch 91 is connected in the electrical circuit with solenoid 22, so that whenever the switch is closed, the solenoid will be energized to disconnect and stop the feed mechanism from operating so that documents cannot be fed through the feed mechanism beyond rolls 64 and 65. The action of the control is so rapid that only the leading edge of documents of a greater thickness than that for which the control is set will engage between feed and control rolls 64 and 65 before the feed mechanism actually stops. This provides for convenient manual removal of the documents at the top front portion of the feed mechanism by the machine operator resulting in the feed mechanism being restored to operation so the operator can again feed the documents into the machine in proper order. This mechanism prevents the feeding of two or more documents simultaneously and also the feeding of documents that are folded or of a greater thickness than is provided for by the setting of control knob 76. This control mechanism may control the operation of the feed in any suitable manner such as just described and shown in either of the co-pending applications hereinabove mentioned whether the feed of documents be manual or mechanical.

A lighting unit is provided for illuminating the documents so that the proper amount of light is reflected from the document into the camera for making photographs. This lighting unit includes a frame 95 hingedly mounted at the lower end on a transversely extending rod 96 mounted in side walls 1 and 2, as shown in Fig. 1. Lighting unit frame 95 has a lamp housing 97 carrying a plurality of lamp bulbs in transversely extending relation arranged to project light toward the photographing position at 98 between the adjacent ends of upper and lower guide units 24 and 25 when frame 95 is in the closed operative position, as shown in full lines in Fig. 1. This frame is movable to an open position to provide access to the document feed mechanism so the upper and lower guide units 24 and 25 can be removed or upper guide unit 24 hingedly moved to an upper open position as disclosed in the aforementioned co-pending applications.

Frame 95 carries a light indicator means, indicated at 99, adapted to indicate when the lights are operating and also to indicate when one or more lamp bulbs is burned out, as disclosed in the aforementioned co-pending applications. Frame 95 has an upward and forwardly extending portion at the upper free end thereof carrying the upper ends of light indicator means 99 and at the upper left-hand corner thereof, as shown in Fig. 2, carries a laterally projecting stud 100. When lighting unit frame 95 is in the closed operative position stud 100 projects transversely across the upper edge of left-hand side wall 2 for engaging bell crank lever 101 pivotally mounted on stud 102 extending outwardly from the upper edge portion of side wall 2. The upwardly extending short arm of bell crank 101 has one end of coil spring 103 connected therewith and the opposite end connected with pin 104 on side wall 2 positioned to the rear of stud 102 for normally moving bell crank 101 in a counter-clockwise direction, as shown in Fig. 2.

A stud 105 projects laterally from side wall 2 for limiting the counter-clockwise movement of bell crank 101 by spring 103 so the end of the hooked portion 106 of bell crank 101 will be operated to engage projection 107 on the end of upwardly extending arm 99 of bell crank 86 to rotate bell crank 86 in a counter-clockwise direction, as shown in Fig. 3, to operate micro-switch 91 for closing the circuit. This operation of micro-switch 91 to close the circuit and maintain it in closed condition occurs whenever frame 95 is moved out of the operative position where pin 100 normally engages the upper edge of bell crank 101 as shown in Fig. 2. Bell crank 101 normally has hook end 106 below the upper end of projection 107. This operation of bell crank 101 allows the free end of projection 107 to extend into the space between hook end 106 and the arm portion of bell crank 101 extending outwardly from pivot stud 102. It will therefore be seen that it is necessary that the lighting unit frame 95 be secured in operative position before documents can be fed through the machine.

The document indexing feature of the present invention provides document indexing drum 110 located between left-hand end wall 3 of the main document feed unit and left-hand side wall 2, as clearly shown in Figs. 3 and 5. Drum 110 includes an annular disc 111 having a central opening receiving the hub portion of clutch member 39 for bearing engagement thereon as shown in Fig. 5. A sectional cylindrical sheet metal rim 112 is secured on the periphery of disc 111 at a plurality of positions for cooperation to provide the supporting structure for the several indicia displaying mechanisms.

Friction discs 113 engage against opposite faces of annular discs 111 about the hub of clutch 39 so that a movable clutch disc 114 slidably mounted on hub 39 may be resiliently actuated to move against one friction disc 113 and move annular disc 111 with the other friction disc against the annular flange on the left-hand end of clutch member 39, as shown in Fig. 5. A collar 115 is mounted on the right-hand end of clutch member 39 against rotation relative thereto and has an annular flange formed with openings slidably receiving rods 116 secured to movable clutch disc 114. Compression coil springs 117 are mounted on rods 116 between the flange on collar 115 and movable clutch disc 114 to normally maintain frictional engagement between clutch member 39 and annular disc 111 of indicia drum 110 to normally rotate drum 110 with main drive shaft 11.

Drum 110 carries a number displaying unit 120, a date unit 121, and two location designating units 122 and 123 respectively, located in different circumferential positions about drum 110, as shown in Fig. 4.

The structure of numbering unit 120 is shown in Figs. 4, and 14 to 17.

Numbering unit 120 has two brackets 124 and 125 bolted together on opposite sides of annular disc 111 with offset free end portions in spaced parallel relation from each other and disc 111 in registry with an aperture in disc 111. The offset free ends of brackets 124 and 125 have bearing openings therein axially aligned with the aperture in disc 111 for rotatably receiving opposite ends of shaft 126. Shaft 126 includes a tubular socket member 127 mounted on the left-hand end thereof rotatably engaged in bracket 125. Socket 127 is rigidly mounted on the end of shaft 126 and has the free end formed with slots 128. A ratchet wheel 129 is rigidly mounted on tubular socket 127 for rotation therewith and is located against the inner face of bracket 125 acting as a washer to limit endwise movement of shaft 126 in the bracket.

A unit number wheel 130 is rigidly mounted on shaft 126 adjacent ratchet wheel 129, as shown in Fig. 14, for rotation with shaft 126. Tens, hundreds, and thousands number wheels indicated by the numerals 131, 132 and 133 respectively, are rotatably mounted in successive order on shaft 126 with tens number wheel 131 adjacent units number wheel 130.

The several number wheels are separated by pinion discs 134. Each pinion disc 134 is engaged between a pair of adjacent number wheels and has a central opening engaged over hub 126. Pinion discs 134 are attached to supporting bars 135 connecting all of pinion discs 134 together for holding them against rotation with shaft 126 and the number wheels. An arm 136 extending laterally from the lower portion of the offset end of bracket 124 engages the inner supporting bar 135 and holds pinion discs 134 against rotation. Each pinion disc 134 carries a gear pinion 137 rotatably mounted in bearing brackets thereon with the pinion extending through an aperture in the pinion disc. One pinion 137 is mounted in each disc and has inter-meshing engagement with a gear on the hub of an adjacent number wheel. The tens, hundreds and thousands number wheels 131, 132 and 133 respectively, each has a gear 138 formed on one end of the hub portion thereof inter-meshed with the adjacent pinion 137. The gear 138 is illustrated as being formed on the end of the hubs of the several number wheels directed toward the unit number wheel 130. The opposite ends of the hubs of all of the numeral wheels are provided with a pair of number wheel accumulator teeth 139, each adapted to engage the adjacent gear pinion 137 and upon each rotation of the number wheel advance the next number wheel a sufficient amount to advance the numeral displayed thereby one digit. In this way shaft 126 may be rotated to display the digits zero and 1 to 9 inclusive, in successive numerical order and then to operate the tens number wheel to move the display of the digit zero thereon out of position to display the digit one. In this manner each of the number wheels advances the display of the digits thereon in numerical order. The number wheels may be reset to zero by means of resetting spring 140. Resetting spring 140 is mounted in recessed portions of shaft 126 shown in Fig. 14. A plurality of resetting fingers 141 on spring 140 extend circumferentially and radially and have the free ends resiliently engaging the inner faces of the hub of number wheels 131, 132 and 133 so that when shaft 126 is rotated in a direction opposite that during which the number wheels will accumulate numbers in numerical order as above described, fingers 141 will engage resetting shoulders 142, Fig. 15 formed at the zero position of the digits on each number wheel, and reset all the number wheels with the digits in corresponding position so that the zero digit on all of the number wheels may be displayed through a slot 143 in cylindrical rim 112, Fig. 4.

The tens, hundreds and thousands numbers wheels are held in digit displaying position for displaying one of the digits on the periphery thereof through slot 143 by means of pinions 137 which may be provided with a suitable spring pressed retaining device for normally retaining the pinions against rotation in pinion discs 134 of a character well known in the art. Shaft 126 is normally held against rotation by means of a pawl 144 pivotally mounted at its central portion on stud 145 carried by annular disc 111, as shown in Fig. 4. One end of pawl 144 is formed with an angularly extending end portion adapted to engage the ends of the teeth on ratchet wheel 129 for holding shaft 126 against accidental rotation. A coil spring 146 having one end connected to a pin on annular disc 111 and the other end secured to the free end of pawl 144 is normally tensioned to hold the angular end of pawl 144 in engagement with ratchet wheel 129. This operation will hold the unit number wheel, as well as the remaining number wheels in position to display one of the digits on each through slot 143 in cylindrical rim 112.

An advancing mechanism is mounted on annular disc 111 for advancing the number wheels one digit at a time. For this purpose, an advancing lever 147 is pivoted intermediate its ends on pivot stud 148 extending laterally from disc 111. A laterally extending operating pin 149 is mounted on the outer end of lever 147 with the free end projecting outwardly beyond the plane of the edge of cylindrical rim 112 in parallel relation to shaft 11 toward the inner face of side wall 2 for engagement with a digit advancing control mechanism. The opposite end of advancing lever 147 has one end of advancing pawl 150 pivoted thereon and the opposite end positioned to engage one of the teeth on ratchet wheel 129. A pin 151 mounted on annular disc 111 acts to guide pawl 150 and limit oscillating movement of lever 147 in both directions on stud 148 to bring the free end of the pawl into engagement with one tooth for operating the ratchet wheel to rotate shaft 126 an amount sufficient to advance the unit numeral wheel one digit. A coil spring 152 has one end secured to guide pin 151 and the other end secured to pin 153 on the free end of pawl 150 for normally holding pawl 150 and advancing lever 147 in the position shown in full lines in Fig. 4 at one limit of their relative movement ready to be engaged by a suitable operating device to move advancing lever 147 on its pivot and operate ratchet wheel 129. Projection 154 on advancing lever 147 engages pin 151 to limit counter-clockwise rotation of the lever. The mechanism is designed so that pawl 150 will engage one tooth and rotate ratchet wheel 129 only a sufficient distance to advance unit numeral wheel 130 one digit when lever 147 is rotated in a clockwise direction. Then lever 147 engages pin 151 limiting its rotation in a clockwise direction.

The dating unit 121 is shown in Figs. 4, 18 and 19.

Dating unit 121 has a bracket 160 mounted on the right-hand side of annular disc 111 at one end and has the opposite end offset in spaced parallel relation to the disc opposite an aperture provided in the margin of the disc to accommodate the dating unit. A shaft 161 has one end rigidly secured to the offset end of bracket 160 and projects laterally therefrom, as shown in Fig. 18. The free end of shaft 161 is formed with a reduced extension 162. Sleeve 163 is rotatably mounted on shaft 161 and has an inwardly extending annular flange 164 in the outer end apertured to rotatably engage on the reduced extension 162 of shaft 161. A coil spring 165 is mounted on reduced extension 162 between the shoulder formed by the end of shaft 161 and inwardly extending annular flange 164 for normally moving sleeve 163 endwise on shaft 161 until annular flange 164 engages stop pin 166. The outer end of sleeve 163 is provided with recesses 167 for receiving a setting device. It will be noted that sleeve 163 and tubular socket 127 have the same size and are adapted to be engaged by the same setting device in a manner that will be hereinafter described.

A month indicator drum 168 is rotatably mounted on shaft 161 at the inner end of sleeve 163 adjacent bracket 160. Month indicator drum 168 has a polygonal disc 169 rigidly secured thereto with thumb disc 170 having the periphery serrated. Thumb disc 170 is larger in diameter than drum 168 so that its periphery may be manually engaged to set drum 168 in a position to display the desired month of the year thru slot 171 in rim 112. The opposite end of sleeve 163 rotatably mounts year indicator drum 172 having a polygonal disc 173 mounted on the outer side thereof and thumb wheel 174 secured to disc 173 having a diameter greater than the diameter of drum 172 for manual engagement and rotation of year indicator drum so that it may be set to display the desired year indication through slot 171 in cylindrical rim 112.

Between month indicator drum 168 and year indicator drum 172 there are two day indicator wheels 175 and 176, respectively. Each day indicator wheel has the periphery provided with digits zero to nine and is rotatably mounted on sleeve 163. Each day indicator wheel 175 and 176 has a polygonal disc 177 rigidly secured thereto. It will be noted from Fig. 18 that day indicator wheels 175 and 176 have the adjacent ends of the cylindrical outer portions opening toward one another with the supporting disc portions at the opposite ends. This provides a space within the wheels for controlling the setting thereof. For the purpose of setting the day indicator wheels each is provided with setting pins 178 extending inwardly from the outer edge of the supporting disc portion for the wheels into the space inside the cylindrical portion of the wheel. Setting pins 178 are in parallel relation to shaft 161 and the ends terminate in spaced relation to each other when they are in aligned relation.

A setting pin 179 is mounted in the central portion of sleeve 163 in radially extending relation so that it will engage with one set of setting pins 178 depending upon the position of the sleeve on shaft 161 relative to wheels 175 and 176. In the position indicated in Fig. 18, spring 165 holds sleeve 163 at the outer limit of its movement on shaft 161 with setting pin 179 in position to engage setting pins 178 on day indicator wheel 175. By rotating sleeve 163 the desired day indication on wheel 175 may be set into position to be displayed through aperture 171. Should it be desired to set day indicator wheel 176, this is accomplished by sliding sleeve 163 inwardly against the tension of spring 165 until setting pin 179 thereon is disengaged from the setting pins on wheel 175 and positioned to engage setting pins 178 on wheel 176. Sleeve 163 is then rotated to set wheel 176. In this way wheel 176 may have the desired date indicating number set to be displayed through aperture 171. As shown in Fig. 19, each day indicator wheel has 3 setting pins 178 thereon to facilitate the setting of the day indicator wheels in a convenient manner.

A pivot pin 180 mounted on bracket 160 projects laterally and has the intermediate portions of holding pawls 181 pivoted thereon in spaced parallel relation. The outer ends of pawls 181 extend between wheels 168, 172 and at opposite sides of wheels 175 and 176, as shown in Fig. 18, to engage the peripheries of the several polygonal discs 169, 173 and 177. Coil springs 182 corresponding in number to the number of pawls 181 each have one end anchored to an end of one of the pawls 181 and the opposite ends secured to laterally extending pin 183 mounted on an extending portion of bracket 160. Springs 182 are normally tensioned for retaining the opposite ends of pawls 181 engaged with the several polygonal discs to maintain the discs in a position where a flat portion on the disc will be engaged by the pawl for holding each of the several discs with their attached drums and wheels in a position to hold a month, year and day indication of the desired date in exposed position through aperture 171 in cylindrical rim 112.

Figure 10:
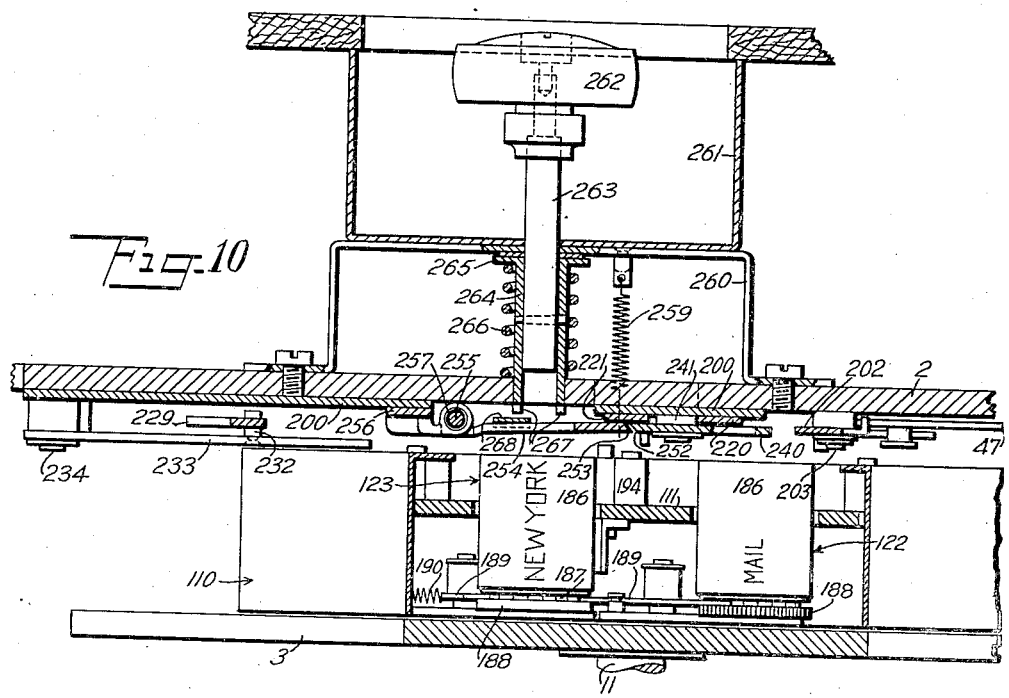
Fig. 10 is an enlarged detailed cross-section taken on line 10—10 of Fig. 4.
Figure 11:
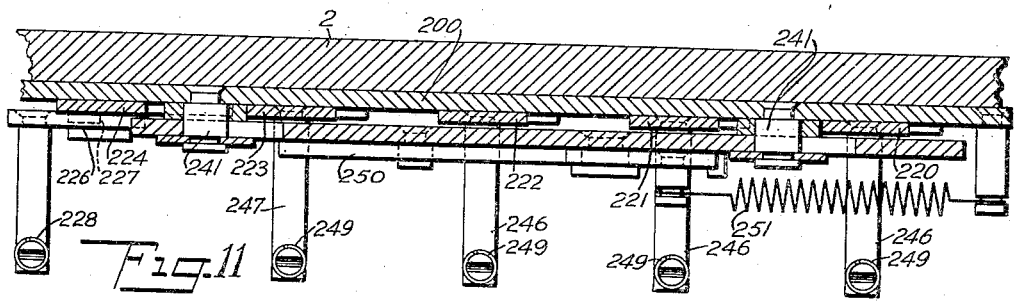
Fig. 11 is an enlarged detailed cross-section taken on line 11—11 of Fig. 6.
Figures 12, 13:
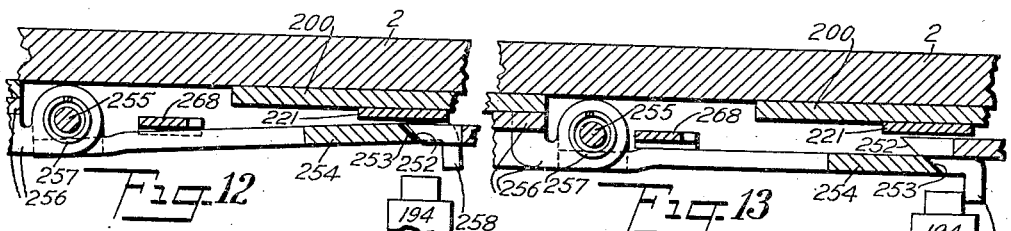
Fig. 12 is an enlarged detailed cross-section taken on line 12—12 of Fig. 6.
Fig. 13 is an enlarged detailed cross-section taken on line 13—13 of Fig. 6.

Location designating units 122 and 123 are of similar construction. These units are illustrated in Figs. 4 and 10.

Each unit includes a bracket 184 having one end portion bolted to the right-hand side of circular disc 111 and the opposite end portion offset to the right of the circular disc and extending in spaced parallel relation to the disc in alignment with an aperture in the margin of the disc. A shaft 185 is mounted in the central portion of the offset end of each bracket and extends through the aperture in the disc toward the opposite side. An indicia supporting cylinder 186 is rotatably mounted on shaft 185. The end of each cylinder adjacent bracket 184 has a polygonal disc 187 secured thereto with a thumb disc 188 adjacent disc 187 at the inner end of the cylinder located next to bracket 184. The periphery of each cylinder is provided with a suitable covering, holders or the like, for carrying the desired indicia to be displayed for each position of the cylinder corresponding to one of the polygonal faces on polygonal discs 187. A pawl 189 is provided for each cylinder pivoted intermediate its ends on bracket 184 with one end engaging polygonal disc 187 between the end of drum 186 and thumb disc 188. Engagement of the end of each pawl 189 between the end of cylinder 186 and thumb disc 188 retains the cylinder in assembled rotary relation on shaft 185 against detachment. Coil springs 190 secured at one end to the free ends of pawls 189 and at the opposite ends to brackets 184 hold the ends of pawls 189 engaged under tension with polygonal discs 187 for retaining cylinders 186 in position to display the indicia on the respective cylinders through slots 191 and 192 formed in transversely extending spaced relation in cylindrical rim 112 opposite the peripheries of cylinders 186. Cylinder 186 of location designating unit 123 has the end shown in Fig. 4 directed toward the left-hand side of the machine, formed with slots 193 about the portion adjacent shaft 185 in the same arrangement and same order as slots 167 of the dating unit and slots 128 of the number displaying unit for receiving a setting member to be described.

The left-hand side of annular disc 111, as shown in Fig. 4, has three stop pins secured thereto, one indicated by the numeral 194 adjacent location designating unit 123, one indicated at 195 adjacent date unit 121 and the third 196 adjacent number displaying unit 120, each adapted to be engaged by a mechanism to be described, for stopping rotation of the disc in order that the unit adjacent to the stop pin may be engaged by a setting member and its setting adjusted. Each of the pins 194, 195 and 196 have the free ends extending beyond the plane of the left-hand end of cylindrical rim 112 of indicia drum 110 so that they may be engaged by the control mechanism for stopping rotation of the drum. Each of these stop pins is located at different radial distances from the center of the drum, stop pin 194 being at the greatest distance, stop pin 195 being at a distance slightly less from the center than pin 194 and stop pin 196 being at the shortest distance from the center of the drum or main drive shaft 11.

A control mechanism is provided for conveniently controlling the operation of indicia drum 110 and for setting the numeral units thereon in a convenient manner. This mechanism is disclosed more particularly in Figs. 2, 3, 4 and 6 to 13.

A control plate 200 is mounted on the inner face of left-hand side wall 2 at the front upper corner portion and has an inclined upper edge carrying a laterally extending guide plate 201 mounted in inclined inwardly extending relation with the upper surface flush with the inclined upper edge of control plate 200.

Figure 6:
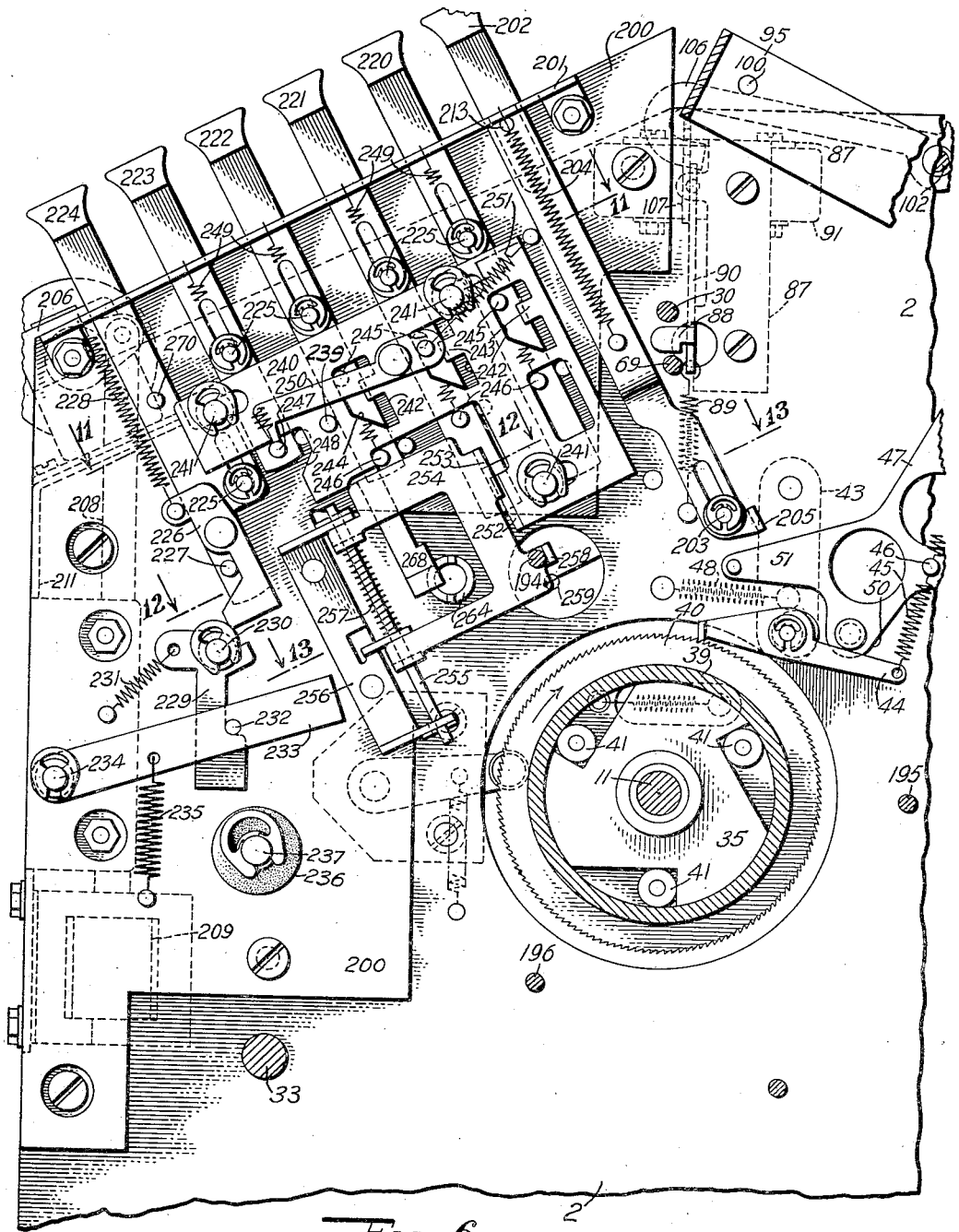
Fig. 6 is a vertical longitudinal cross section taken substantially on line 6—6 of Fig. 3 for illustrating the push button control slide mechanism for the document indexing drum in side elevation looking from the inside or right side of the machine toward the inside of the left-hand side wall.

A push-button control slide 202 has the upper end projecting through a slot in guide plate 201 adjacent plate 200 with a push-button on the upper end thereof positioned above guide plate 201, as shown in Fig. 6. Push-button control slide 202 is arranged in inclined relation in the machine perpendicular to guide plate 201 and has the lower end slotted to slidably engage on guide pin 203 extending inwardly from side wall 2. A coil spring 204 has one end attached to the lower end portion of push-button control slide 202 and the upper end secured to guide plate 201 for normally holding push-button control slide 202 at its upper limit of sliding movement. The lower end of push-button control slide 202 is provided with a lateral projection 205 for engaging arm 51 of control lever 47 when push-button slide 202 is manually depressed to rotate control lever 47 in a clockwise direction on the pivot as shown in Fig. 2, and in a counter-clockwise direction as shown in Fig. 6, for operating micro-switch 55 to close the circuit for lighting the lights in the machine and also for releasing pawl 44 from clutch control ring 40 releasing the clutch for engagement to feed film and expose the same without requiring the feed of documents. This manual control of the film feed and lights is provided for separating the photographic images of groups of documents on the film.

As shown in Figs. 2 and 3 a counter is indicated at 206 having an operating arm 207 extending radially therefrom and connected at the free end to the upper end of operating link 208. The lower end of link 208 is connected to the armature of solenoid 209. Solenoid 209 is connected in a circuit to be energized each time a document passes through the feeding means for counting the number of documents photographed. A coil spring 210 has one end secured to a projection on operating link 208 and the other end secured to a pin mounted on the supporting bracket 211 for the solenoid and the counter carried by side wall 2, as shown in Figs. 2 and 3. Coil spring 210 normally moves operating link 208 upwardly to its upper limit of movement while energization of solenoid 209 pulls the link downwardly to actuate the counter.

A laterally extending pin 212 is mounted on the upper end portion of operating link 208 and extends inwardly toward side wall 2 as shown in Fig. 3. Push-button control slide 202 has an actuating pin 213 on the upper end portion thereof as shown in Fig. 2, extending laterally to engage the inclined end on the L-shaped retaining slide 214 slidably mounted on a pair of guide pins extending outwardly from side walls 2 so that the opposite end will be projected under laterally extending pin 212 on slide 208 whenever push-button control slide 202 is manually actuated into a depressed position. This operation of retaining slide 214 retains operating link 208 in the upper position so that energization of solenoid 209 will not operate the counter. A coil spring 215 secured under tension between a pin on retaining slide 214 and one of the guide pins for the slide normally moves the retaining slide to the left, as shown in Fig. 2, into a position where it does not interfere with the normal operation of operating link 208 by solenoid 209. This condition exists when push-button control slide 202 is in the upper position shown in Fig. 2.

The rotation of indicia drum 110 and the operation of the mechanism thereon is controlled by five push-button operating slides 220, 221, 222, 223 and 224 respectively, as shown in Figs. 6 to 9. Each of these push-button operating slides 220 to 224 inclusive is slidably mounted against the inner face of control plate 200 in spaced parallel inclined relation, parallel to push-button control slide 202 and with the upper end of each slide slidably engaged in and extending through slots formed in guide plate 201 with intermediate portions below guide plate 201 slidably engaged on guide pins 225 extending inwardly from control plate 200. Each of these push-button operating slides is of similar construction but varies in length in the manner shown in Fig. 6.

Push-button operating slide 224 is at the front of the series and at the front of the machine, as shown in Fig. 6. An operating pawl 226 is pivotally mounted intermediate its ends on the lower end of push-button operating slide 224 and normally rotated in a clockwise direction as shown in Fig. 6 to have the lower end engage limiting pin 227 by a tension coil spring 228 connected at opposite ends to the upper end of operating pawl 226 and guide panel 201. The lower end of operating pawl 226 is adapted to engage latch member 229 pivoted on stud 230 and normally operated in a counter-clockwise direction as shown in Fig. 6 by coil spring 231 connected at opposite ends to one arm of the latch member and guide plate 200. This spring operation of latch member 229 normally acts to engage the lower end of latch member 229 with laterally extending pin 232 on the intermediate portion of advancing bar 233 pivoted at its forward end on pivot stud 234. In the position shown in Fig. 6 the latching shoulder on the lower end of latch member 229 engages under pin 232 and normally holds numeral advancing bar in an upward rearwardly inclined position, as shown in Fig. 6, where it is inoperative to cause an advance or operation of the numeral displaying unit 120. A coil spring 235 has one end connected to numeral advancing bar 233 and extends downwardly therefrom for connection at the opposite end to a stud on control plate 200 for normally applying tension to operate numeral advancing bar 233 in a clockwise direction to move the rear end downwardly until it engages positioning disc 236 mounted on a holding stud 237 extending inwardly from the inner face of control plate 200 near the lower end thereof. Latch member 229 has a rearwardly and upwardly extending projection adjacent stud 230 aligned with the lower end of operating pawl 226 for engagement thereby when push-button operating slide 224 is manually depressed or moved downwardly.

Manual operation of slide 224 will rotate latch member 229 after engagement of operating pawl 226 therewith to move it in a clockwise direction as shown in Fig. 6, for disengaging the shoulder on the lower end thereof from pin 232. This allows spring 235 to move numeral advancing bar 233 downwardly into engagement with positioning disc 236 for positioning the rear end of bar 233 to engage operating pin 149 on advancing lever 147 as indicia drum 110 rotates with main drive shaft 11, as shown in dotted lines in Fig. 4. In the continued rotation of the drum from the position of advancing lever 147 and numeral advancing bar 233 shown in Fig. 4 in dotted lines, pawl 150 will be operated to engage ratchet wheel 129 and advance unit number wheel 130 one digit by partial rotation thereof with shaft 126.

As soon as advancing lever 147 has been rotated on pivot stud 148 to an extent sufficient to advance unit numbering wheel 130, one digit, the inner end of lever 147 will engage guide pin 151 and have its movement limited thereby so that upon further rotation of indicia drum 110 operating pin 149 of lever 147 will move the rear end of numeral advancing bar 233 upwardly about its pivot until laterally extending pin 232 is above the shoulder on latch member 229 whereupon the latch member will move into the full line position shown in Figs. 4 and 6 and latch numeral advancing bar 233 in an inoperative position. At the completion of this movement of numeral advancing bar 233 pin 149 will move beyond the end thereof and continue rotation with drum 110. Spring 152 will move advancing lever 147 and pawl 150 back into the position shown in full lines in Fig. 4 ready for the next digit advancing operation.

If push-button operating slide 224 is manually held in a depressed position for more than one revolution of main drive shaft 11 and indicia drum 110, numeral advancing bar 233 will remain in an operative position for engaging and advancing unit number wheel 130 one digit for each revolution of indicia drum 110 and accumulate the numbers on the several number wheels, by the operation of the several number wheels, in a manner hereinabove described in connection with the description of the structural features of number displaying unit 120. When push-button operating slide 224 is pushed down and immediately released, numeral advancing bar 233 will be released and secure only one operation of the number displaying unit 120 so as to advance the number only one digit which is accumulated by addition to the number already displayed through slot 143 in rim 112.

Means is provided for manually resetting number displaying unit 120 to zero or any other number desired and manually setting date unit 121 and location designating units 122 and 123. This means requires the rotation of the drum to be stopped during the setting operation of the various units thereon and for this purpose the drum must be stopped in different positions in order to provide for a single setting member to be used. For this purpose mechanism is provided for engaging stop pins 194, 195 and 196. This mechanism is controlled and operated by push-button operating slides 220, 221, 222 and 223.

An operating plate 240 is formed with transversely extending slots slidably receiving guide projections 241 extending inwardly from control plate 200 between the push-button operating slides, as shown in Fig. 6. Operating plate 240 is slidably mounted against the inner faces of push-button slides 220 to 224 inclusive in spaced parallel relation below guide plate 201 for slidable movement transversely across the push-button operating slides and at right angles to the sliding movement thereof.

Operating plate 240 is apertured in transversely aligned relation in registry with push-button control slides 220, 221 and 222 as indicated at 242, to provide slide control projections 243. Apertures 242 are also formed to provide inclined cam faces 244 on operating plate 240 at the lower ends of apertures 242. Each push-button operating slide 220, 221 and 222 is provided with a laterally extending operating pin 245 projecting through one of the openings 242, as shown in Fig. 6. Operating pins 245 are located in the same corresponding position on each of the operating slides 220, 221 and 222. Each of these push-button operating slides 220, 221 and 222 also has a second operating pin 246 extending laterally therefrom in equally spaced relation below pins 245 through cut-out portions of operating plate 240 formed in a manner so that they will not interfere with the lateral sliding movement of the operating slide on guide projections 241.

Push-button operating slide 223 only has one operating pin 247 mounted on the lower end portion thereof and extending laterally through a cut-out portion in the lower front portion of operating slide 240, as shown in Fig. 6. Operating slide 240 is formed with an inclined cam face 248 on a central front edge portion below the position of operating pin 247, when it is in the inoperative position as shown in Fig. 6, for engagement by said pin in downward movement thereof when operating plate 240 is in the opposite limit of sliding movement from that shown in Fig. 6 such as illustrated in Figs. 7 to 9 inclusive. A plurality of tension coil springs 249 have the upper ends secured to guide plate 201 in spaced relation and arranged to have the lower end of each spring attached to one of the second operating pins 246 and operating pin 247. These coil springs 249 will normally be under tension to hold push-button operating slides 220 to 223 inclusive in an inoperative position at the upper limit of movement at shown in Fig. 6.

A holding pawl 250 is pivoted on the inner face of operating plate 240 intermediate its ends and has a lateral depending extension on the forward end arranged to engage on the upper periphery of operating pin 247 on push-button operating slide 223 in the inoperative position thereof. The opposite end of holding pawl 250 has one end of coil spring 251 secured thereto with the opposite end secured to an inwardly extending pin on control plate 200 to the rear of operating plate 240 and adjacent the upper corner thereof in the inoperative position. Spring 251 is normally tensioned to rotate holding pawl 250 in a counter-clockwise direction as shown in Fig. 6, so that when operating plate 240 is moved to the left from the position shown in Fig. 6 to the positions shown in Figs. 7 to 9 inclusive the depending lateral extension on the free end thereof will move downwardly in front of operating pin 247 and retain operating plate 240 in the position shown in Figs. 7 to 9 inclusive, against the tension of spring 251 tending to return it to the position shown in Fig. 6.

The lower rear portion of operating plate 240 is formed to provide a beveled edge 252 to provide an operating cam for engaging the complementary beveled projection 253 on holding lever 254 pivoted at the forward end opposite projection 253 for vertical sliding movement on pivot pin 255 carried by holding lever supporting bracket 256 mounted on control plate 200 and having upper and lower end portions and an intermediate projection extending inwardly in spaced parallel relation from control plate 200 to receive and support pivot pin 255 at the upper and lower ends and the intermediate portion thereof. A coil spring 257 encircling pivot pin 255 engages between the intermediate portion on bracket 256 and the upper front end portion of holding lever 254 for normally holding lever 254 at the upper end of its sliding movement on pin 255 against the upper pin supporting portion of bracket 256.

The rear lower end of holding lever 254 is provided with a lateral inwardly extending holding projection 258 arranged so that it may be positioned to selectively engage stop pins 194, 195 and 196 respectively, an indicia drum 110. A coil spring 259 has one end secured to the lower rear corner of holding lever 254 and the opposite end extended laterally outward through an aperture in side wall 2 as shown in Fig. 10, with the opposite end secured to U-shaped bracket 260. Spring 259 is normally tensioned to move the rear end of holding lever 254 outwardly so that the outer face thereof will engage the inner face of control plate 200 and thereby move holding projection 258 outwardly to engage the left-hand side wall 2 so that the end will not engage with any of the stop pins 194, 195 or 196. It will be understood however that holding lever 254 in the upper position on pivot pin 255, as shown in Fig. 6, will have holding projection 258 arranged in aligned position for engaging stop pin 194 spaced radially outward from shaft 11 the greatest distance. This is indicated in Fig. 6. However, when holding lever 254 is in the position shown in Fig. 6 with the rear end held up against control plate 200, coil spring 259 holds this plate in a position so that holding projection 258 will not engage stop pin 194, but in the rotation of the drum, pin 194 will move past the inner end of holding projection 258.

Bracket 260, Fig. 10, has the ends of the legs secured to the outer surface of side wall 2 with the central portion of the bracket offset outwardly to the left of side wall 2 in spaced relation. The bottom portion of a cup member 261 is secured to the central offset portion of bracket 260 with the outer open end abutting the inner edge of left-hand side wall 2 of the casing. The left-hand side wall of the casing has an aperture formed therein as shown in Fig. 10 to provide manual access to the inside of cup member 261 for gripping handle 262. Handle 262 is mounted on the outer end of shaft 263 extending through registering apertures in bracket 260 in the bottom of cup member 261 and having a setting member 264 in the form of a sleeve rigidly secured thereto for sliding and rotating movement with shaft 263. The outer end of setting sleeve member 264 is formed with an annular flange 265 for engaging the central offset portion of bracket 260 to limit the outward sliding movement of sleeve 264 and shaft 263 under the operation of compression spring 266 engaged between flange 265 and the outer face of left-hand side wall 2 about setting sleeve member 264. The inner end of setting member 264 is formed with a pair of diametrically opposite setting projections 267 projecting inwardly in parallel relation from the inner end. The inner end of setting sleeve member 264 is slidably engaged in an aperture in left-hand side wall 2 and is located in a position in spaced parallel relation to the axis of main drive shaft 11 having the radial distance between the center of main drive shaft 11 and the center of sleeve 264 equal to the radial distance of the centers of shaft 126 of number displaying unit 120, sleeve 163 of date unit 121, and shaft 185 of location designating unit 123. Therefore, whenever one of these shafts on indicia drum 110 is in axially aligned relation with setting sleeve member 264, handle 262 may be manually gripped for slidably moving shaft 263 and setting member 264 inwardly to engage setting projections 267 in the recesses in the end of the shaft on indicia drum 110 in aligned relation therewith so that rotation of the handle will rotate the shaft of the engaged unit for setting the indicia thereon.

Setting member 264 is prevented from inward movement to engage any of the shafts on indicia drum 110 by means of a guard projection 268 extending downwardly from the lower forward central portion of operating plate 240 and having the lower end in the position of plate 240 in Fig. 6 overlying the end of setting sleeve member 264. This guard projection prevents operation of the setting member while drum 110 is rotating.

Whenever electric switch 269, Fig. 1, mounted on the front upper corner of right-hand side wall 1 is manually operated to close the circuit thereto for starting the motor and setting the machine in operation, the push-button operating slides can then be operated for changing the setting of indicia on indicia drum 110 in the following manner.

In the normal operation of the machine, main drive shaft 11 will be continuously driven for feeding and photographing any documents inserted into the document feed mechanism at the upper end thereof. Indicia drum 110 will be continuously driven by the clutch structure with shaft 11. The position of the indicia at the periphery of indicia drum 110 is arranged so that the indicia move at the same surface or lineal speed as the documents being fed through the machine for photographing. The indicia on drum 110 are photographed as they are moved through the photographing position at one side of the document being fed by the feed means.

When it is desired to change the setting of location designating units 122 and 123, the operator of the machine depresses push-button operating slide 220. As the slide is moved down manually operating pin 245 will be moved downwardly into engagement with inclined cam face 244 at the bottom of aperture 242 and will move operating plate 240 forwardly or to the left as illustrated in Figs. 6 and 7, until pin 245 reaches the bottom of the cam. In this position the depending lateral extension on the free end of holding pawl 250 will move downwardly in front of operating pin 247 and hold operating plate 240 in the position shown in Fig. 7. When push-button operating slide 220 is released coil spring 249 thereon will pull the slide back upwardly until operating pin 245 engages slide control projection 243. Push-button slide 220 will therefore be held in a depressed position corresponding to that shown in Fig. 7. In this position of operating slide 240 as shown in Fig. 7 beveled edge 252 on the operating slide will have engaged beveled projection 253 of holding lever 254 and move the rear end thereof inwardly against the tension of coil spring 259 so as to move holding projection 258 into position in line with stop pin 194 for engaging the free end of pin 194 and stopping indicia drum 110 from further rotation with shaft 11.

When drum 110 is stopped by stop pin 194 engaging holding projection 258, location designating unit 123 will have shaft 185 thereof aligned in axial relation with setting sleeve member 264 and operating slide 240 will have guard projection 268 moved out of line with sleeve 264 so that it can be moved inwardly to engage setting projections 267 in a pair of slots 193 in indicia supporting cylinder 186. This position of the parts is shown in Fig. 10, before setting member 264 is moved inwardly into engagement with cylinder 186 and before operating slide 240 has been set in the position shown in Fig. 7. When the setting member is engaged with cylinder 186 manual rotation of handle 262 will enable the operator to set cylinder 186 to display any indicia on the surface of the cylinder through the slot in rim 112 of the drum that may be desired to have displayed in photographing position for recording on the film with documents being photographed.

It will be noted that the motion of drum 110 is stopped with these units 122 and 123 in a position where they will be accessible through the upper front portion of the casing for convenient visual inspection and manual operation by the machine operator. Since location designating unit 122 cannot be positioned to have the cylinder 186 thereof set by operating handle 262, it is located in a position so that manual access through an opening in the front upper portion of the machine is provided for manual rotation of the cylinder by engaging thumb disc 188 to rotate the cylinder to the desired position for displaying the desired indicia. Pawls 189 engaging the flat faces on polygonal discs 187 retain cylinders 186 against rotation after they have been set to the desired position.

Indicia drum 110 may then be released for further rotation with main drive shaft 11 by depressing push-button operating slide 223 downwardly when the parts are in the position shown in Fig. 7. Operating pin 247 will be disengaged from the depending end of holding pawl 250 because its movement is limited in a counterclockwise direction by lateral projection 239 on operating slide 240. When operating pin 247 has become disengaged from holding pawl 250 coil spring 251 will move operating plate 240 to the right from the position shown in Fig. 7 back to the position shown in Fig. 6. This operation of operating plate 240 is assisted by operating pin 247 engaging inclined cam face 248 in the downward movement of slide 223. The setting member will have been restored to the inoperative position prior to this operation by manually releasing handle 262 as coil spring 266 will normally retain the setting member in inoperative position. Guard projection 268 will move over the end of setting member 264. Coil spring 259 will move holding member 254 on its pivot to disengage holding projection 258 from stop pin 194. Upon stop pin 194 becoming disengaged from projection 258 indicia drum 110 will again start to rotate with shaft 11.

It will be noted as shown in Fig. 7 that whenever operating plate 240 is moved to the left-hand position the upper forward end thereof will engage under lateral projecting pin 270 on push-button operating slide 224 and prevent manual operation thereof, so that numeral advancing bar 233 cannot be released.

The date unit 121 may have the dates thereon reset by manually depressing push-button operating slide 221 downwardly. Operating plate 240 will be moved from the position shown in Fig. 6 to the left by operating pin 245 in the same manner as above described in depressing slide 220. Operating plate 240 will be moved to the left-hand position, as shown in Fig. 8, for holding slide 221 in a depressed position. Second operating pin 246 on slide 221 will engage the upper end of beveled projection 253 which terminates at a distance below the upper edge of holding lever 254 and will move holding lever 254 downwardly on pivot pin 255 to the position shown in Fig. 8. Holding lever 254 will also have the rear end moved inwardly by beveled edge 252 engaging beveled projection 253 and camming it inwardly. This will position holding projection 258 in position to engage stop pin 195 and stop the rotation of drum 110 with sleeve 163 of the date unit in axial alignment with setting sleeve member 264. Push-button operating slide 224 is again rendered inoperative to release numeral advancing bar 233. Handle 262 may again be engaged and operated to engage setting projections 267 in slots 167 in sleeve 163. When the engagement takes place with sleeve 163 in the position shown in Fig. 18, rotation of the setting member will rotate day indicator wheel 175 so that it may be set in a desired position. By pushing the setting member inwardly to a greater extent, sleeve 163 may be moved inwardly to engage setting pin 179 with one of setting pins 178 on day indicator wheel 176 so that rotation of the setting member will rotate sleeve 163 and set day indicator 176 to the desired position. Manual release of the setting member will allow it to be returned to the inoperative position.

The operator may observe the setting of the day indicator wheels thru an opening at the upper front portion of the machine casing and may also manually engage thumb wheels 170 and 174 for setting the month and year indicia drums in a desired position. Then, by depressing push-button operating slide 223 the mechanism is again restored to its initial position as shown in Fig. 6 and drum 110 is again continuously rotated with main operating shaft 11.

Number displaying unit 120 may be reset to the zero position or any other desired position by manually depressing push-button operating slide 222 to start the setting operation. This will obtain movement of operating plate 240 from the position shown in Fig. 6 to the left in a manner above described in connection with the operation of slides 220 and 221 until operating plate 240 is latched in the left-hand position shown in Fig. 9. Depression of push-button operating slide 222 engages second operating pin 246 thereon with the upper edge of holding lever 254 and moves it downwardly on pivot pin 255 to a greater extent than it was operated by slide 221, as shown in Fig. 9, in order to position holding projection 258 in a position to engage stop pin 196 for stopping the rotation of drum 110 with shaft 126 in axially aligned relation with setting sleeve member 264. Handle 262 of the setting member may then be manually operated to engage setting projections 267 in slots 128 in the end of tubular socket 127. Rotation of the setting member in one direction will rotate shaft 126 to operate the number wheels to accumulate numbers successively thereon and in the opposite direction will operate shaft 126 to cause resetting fingers 141 to engage the number wheels and reset them to zero position or to display such other desired consecutive series of numbers displayed thereby as may be desired to have displayed through slot 143 in rim 112. When handle 262 is manually released spring 266 returns it to the inoperative position shown in Fig. 10 whereupon depression of push-button operating slide 223 will restore the parts to the initial position hereinabove described and shown in Fig. 6 and release pin 196 from holding projection 258 so that drum 110 may again rotate with main drive shaft 11.

Attention is directed to Figs. 7 to 9 illustrating that whenever one of push-button control slides 220, 221 or 222 is depressed to secure the above described operation of the parts, slide control projections 243 operate to retain the operated push-button slide in the inoperative position so that when operating plate 240 is in the position shown in either of Figs. 7 to 9 inclusive, manual operation of all of the push-button operating slides except 223 is prevented. This provides an effective control over the selective operation of the several push-button operating slides in setting the indicia mechanism on drum 110.

The indicia indexing and control mechanism constructed as above described provides an efficient mechanism for displaying information to be photographed on one edge of the film simultaneously with the photographing of a plurality of documents on the film to indicate the date, zone numbers and other identification numbers that may be desired together with location designating indicia or titles that greatly facilitate the handling of the film and the filing and distribution thereof particularly where more than one copy of the document is to be reproduced for record keeping purposes.

The invention claimed is:

1. In a document photographing machine, a support, a drum rotatable on said support, means for normally rotating said drum, a changeable indicia unit mounted on said drum to display indicia at the periphery thereof, a number advancing means mounted on said drum having a pawl operable to engage said indicia unit for advancing the indicia of said unit in successive order, a numeral advancing member pivoted on said support and movable into an operative position to be engaged by said number advancing means and cause movement of said advancing means for changing the indicia displayed by said indicia unit, said advancing means cooperating with said advancing member to move it into an inoperative position at the end of each advancing operation, means for normally holding said advancing member in inoperative position, and manual means for releasing said advancing member for engaging and operating said advancing means in the rotation of said drum relative thereto.

2. In a document photographing machine, a support having spaced side walls, a drum, a plurality of changeable indicia displaying units mounted on said drum for displaying indicia at the periphery of said drum, means mounting said drum adjacent one of said side walls for normal rotation with and during the rotating movement thereof, a plurality of stop members mounted on said drum one for each indicia unit, a holding member mounted on the adjacent side wall selectively operable to engage one of said stop members, a plurality of control members corresponding in number to the number of indicia units and stop members on said drum, said control members being movably mounted on said adjacent side wall, normally retained in inoperative position and each being manually operable to engage and move said holding member into a selected position to engage one of said stop members and stop rotation of said drum to provide access to the selected indicia unit, means operated by said control members to prevent operation of all of the control members when one of said control members is in operated position, and another control member adjacent said first-mentioned control members manually operable to disengage the last-mentioned means for restoring an operated control member and said holding member to inoperative position.

3. In a document photographing machine, a support having spaced side walls, a drum, a plurality of changeable indicia displaying units mounted on said drum for displaying indicia at the periphery of said drum, means mounting said drum adjacent one of said side walls for normal rotation with and during the rotating movement thereof, a plurality of stop members mounted on said drum one for each indicia unit, a holding member mounted on the adjacent side wall selectively operable to engage one of said stop members, a plurality of operating slides slidably mounted in spaced parallel relation on the adjacent side wall, an operating plate slidably mounted on said adjacent side wall adjacent said operating slides, said operating slides and plate being formed for cooperation to selectively operate said holding member into operative position to engage one of said stop members by manually moving a selected operating slide for stopping rotation of said drum for providing access for setting a selected indicia unit and said operating plate cooperating with said operating slides to retain all but one in position against operation, and means retaining said operating plate in operative position, said one of said operating slides being manually operable to release said operating plate for return to inoperative position releasing all of said operating slides for selective operation.

4. In a document photographing machine, a support having spaced side walls, a drum, a plurality of changeable indicia displaying units mounted on said drum for displaying indicia at the periphery of said drum, means mounting said drum adjacent one of said side walls for normal rotation with and during the rotating movement thereof, a plurality of stop members mounted on said drum one for each indicia unit, a holding member mounted on the adjacent side wall selectively operable to engage one of said stop members, a plurality of operating slides slidably mounted in spaced parallel relation on the adjacent side wall, one operating slide being provided for each indicia unit formed for manual operation to selectively operate said holding member into position to select the stop member for a designated indicia unit, an operating plate slidable on said adjacent side wall adjacent said operating slides and formed for slidable operation by a selected operating slide for engaging and moving said holding member into position to engage the stop member for the selected indicia unit and move said operating plate into operative position to lock all but one of said slides against operation, and latch means for latching said operating plate in operated position, said one operating slide being manually operable to disengage said latch means and move said operating plate into inoperative position to restore said holding member and operating slides to inoperative position for subsequent selective operation.

5. In a document photographing machine, a support having spaced side walls, a drum, a plurality of changeable indicia displaying units mounted on said drum for displaying indicia at the periphery of the drum, means mounting said drum adjacent one of said side walls for rotation relative to said side walls, a plurality of stop members on said drum one for each indicia unit, and indicia unit advancing means on said drum operable to advance the indicia on one of said units, a plurality of control members movably mounted on said adjacent side wall, one of said control members being manually operable to operate means for releasing said indicia unit advancing means to cause the advance of the indicia on said one unit as the drum rotates, a plurality of the remaining control members being selectively operable to move a holding projection to engage a selected stop member for stopping rotation of said drum, means operated by said last-mentioned control members for latching all of said control members against operation when one of said last-mentioned control members is moved into operative position, and another control member operable to release the remaining control members from said latched position.

6. In a document photographing machine, a support, a drum rotatable on said support, means for normally rotating said drum, a changeable indicia unit mounted on said drum to display indicia at the periphery thereof, a number advancing means mounted on said drum having a pawl operable to engage said indicia unit for advancing the indicia of said unit in successive order and an advancing lever pivotally connected to said pawl engageable for operating said pawl, a numeral advancing bar pivoted on said support and movable into a position to be engaged by said advancing lever during the rotation of said drum for engaging and causing movement of said advancing lever to change the indicia displayed by said indicia unit, said advancing lever cooperating with said numeral advancing bar to move said bar into an inoperative position at the end of each advancing operation thereof, a latch member pivoted on said support normally operable to engage and hold said numeral advancing bar in inoperative position, a manually operable slide member slidably mounted on said support formed to engage said latch member for moving it on its pivot into disengaged relation relative to said numeral advancing bar for releasing said bar for movement into position to engage said advancing lever in the rotation of said drum.

7. In a document photographing machine, a support, a drum rotatable on said support, a plurality of changeable indicia displaying units mounted on said drum for displaying indicia at the periphery of the drum, means mounting said drum adjacent a predetermined portion of said support for rotation relative thereto, a plurality of stop members on said drum, one for each indicia unit, indicia unit advancing means on said drum operable to advance the indicia on one of said units, a plurality of control members movably mounted on said support adjacent said drum, means on said support normally operated to be engaged by said indicia unit advancing means and cause operation of said indicia unit advancing means to change said indicia unit, one digit during and for each rotation of said drum, means for normally retaining said last-mentioned means in inoperative position, one of said control members being manually operable to release said indicia unit advancing means for positioning to cause advance of the indicia on the unit operated thereby as the drum rotates, a plurality of the remaining control members being selectively operable to position a selective stop member for stopping rotation of said drum, means operated by said last-mentioned control members for latching all of said control members against operation when one of said last-mentioned control members is moved into operative position, and another control member operable to release the remaining control members from said latched position.

FRIEDRICH J. SCHUTT.

REFERENCES CITED

The following references are of record in the file of this patent:

UNITED STATES PATENTS

| Number | Name | Date |
|---|---|---|
| 541,180 | Reinhardt et al. | June 18, 1895 |
| 584,073 | Dexter | June 8, 1897 |
| 625,094 | Dexter | May 16, 1899 |
| 790,681 | Dexter | May 23, 1905 |
| 869,324 | Obert | Oct. 29, 1907 |
| 875,260 | Gustafson | Dec. 31, 1907 |
| 1,218,988 | Droitcour | Mar. 13, 1917 |
| 1,428,331 | Johnson | Sept. 5, 1922 |
| 1,500,424 | Smith | July 8, 1924 |
| 1,502,128 | Smith | July 22, 1924 |
| 1,536,458 | Smith | May 5, 1925 |
| 1,544,860 | Reisbach | July 7, 1925 |
| 1,701,861 | Niblack | Feb. 12, 1929 |
| 1,728,402 | Eschenbach | Sept. 7, 1929 |
| 1,748,489 | McCarthy | Feb. 25, 1930 |
| 1,820,010 | Cogswell | Aug. 25, 1931 |
| 1,919,433 | Hutchings | July 25, 1933 |
| 1,919,957 | Lyman | July 25, 1933 |
| 1,954,318 | Hopkins | Apr. 10, 1934 |
| 1,966,348 | Hughey | July 10, 1934 |
| 1,976,346 | Hughey | Oct. 9, 1934 |
| 1,987,064 | Hopkins | Jan. 8, 1935 |
| 2,072,236 | Wormser | Mar. 2, 1937 |
| 2,115,563 | Tauschek | Apr. 26, 1938 |
| 2,131,911 | Ayres | Oct. 4, 1938 |
| 2,165,340 | Butler | July 11, 1939 |
| 2,194,808 | Pooley, Jr. | Mar. 26, 1940 |
| 2,251,570 | Hessert | Aug. 5, 1941 |
| 2,262,152 | Welk | Nov. 11, 1941 |
| 2,271,394 | Hayes | Jan. 27, 1942 |
| 2,312,472 | Oiler | Mar. 2, 1943 |

FOREIGN PATENTS

| Number | Country | Date |
|---|---|---|
| 393,468 | Great Britain | June 8, 1933 |